(12) United States Patent
Lacki et al.

(10) Patent No.: US 10,843,104 B2
(45) Date of Patent: Nov. 24, 2020

(54) SYSTEM AND PROCESS FOR BIOPOLYMER CHROMATOGRAPHY

(71) Applicant: CYTIVA SWEDEN AB, Uppsala (SE)

(72) Inventors: Karol Lacki, Uppsala (SE); Martin Hall, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 102 days.

(21) Appl. No.: 14/281,179

(22) Filed: May 19, 2014

(65) Prior Publication Data

US 2014/0251913 A1   Sep. 11, 2014

Related U.S. Application Data

(63) Continuation-in-part of application No. 13/991,239, filed as application No. PCT/SE2011/051468 on Dec. 2, 2011.

(30) Foreign Application Priority Data

Dec. 3, 2010 (SE) ........................................ 1051279

(51) Int. Cl.
| | | |
|---|---|---|
| *B01D 15/18* | (2006.01) | |
| *B01D 15/24* | (2006.01) | |
| *B01D 15/38* | (2006.01) | |
| *G01N 30/88* | (2006.01) | |
| *G01N 30/46* | (2006.01) | |
| *G01N 30/44* | (2006.01) | |

(52) U.S. Cl.
CPC ....... *B01D 15/1871* (2013.01); *B01D 15/242* (2013.01); *B01D 15/3809* (2013.01); *G01N 30/465* (2013.01); *G01N 30/44* (2013.01); *G01N 30/468* (2013.01); *G01N 2030/8831* (2013.01)

(58) Field of Classification Search
None
See application file for complete search history.

(56) References Cited

U.S. PATENT DOCUMENTS

| 7,901,581 B2 | 3/2011 | Bryntesson et al. |
| 2008/0116122 A1* | 5/2008 | Wheelwright ......... G01N 30/88 |
| | | 210/87 |
| 2009/0149638 A1 | 6/2009 | Ley et al. |
| 2010/0176058 A1* | 7/2010 | Bryntesson ........ B01D 15/1828 |
| | | 210/659 |

FOREIGN PATENT DOCUMENTS

| CA | 2509677 A1 * | 1/2006 | ............ B01F 13/002 |
| CN | 101053705 A | 10/2007 | |
| WO | WO 2008/064242 | 5/2008 | |

OTHER PUBLICATIONS

Search Report dated May 27, 2014 Issued on Corresponding CN Patent Application No. 201180057837.4.

* cited by examiner

*Primary Examiner* — Kara M Peo
(74) *Attorney, Agent, or Firm* — Eversheds Sutherland (US) LLP

(57) ABSTRACT

A chromatography system for separation of a biopolymer is described, comprising at least one feed tank, at least one hold tank, at least one elution buffer tank, at least one eluate tank, at least two packed bed chromatography columns and at least one pump and at least one outlet detector both fluidically connected to said each packed bed chromatography column, wherein the feed tank, the hold tank(s), the elution buffer tank and the eluate tank are each fluidically connected to the packed bed chromatography columns via a system of valves.

13 Claims, 21 Drawing Sheets l)

k)

j)

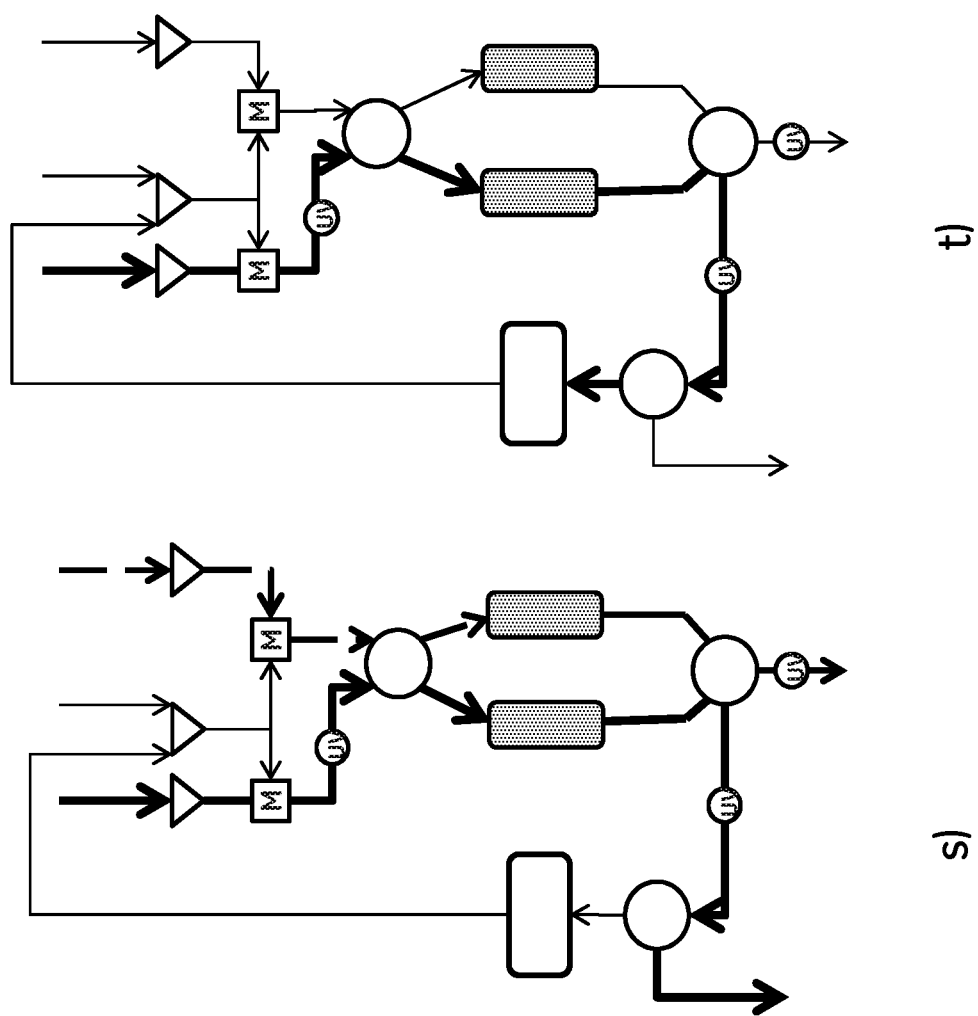

SYSTEM AND PROCESS FOR BIOPOLYMER CHROMATOGRAPHY

CROSS-REFERENCE TO RELATED APPLICATIONS

This application is a continuation-in-part of U.S. patent application Ser. No. 13/991,239 filed Jun. 3, 2013, which is a filing under 35 U.S.C. 371 of international application number PCT/SE2011/051468, filed Dec. 2, 2011, published on Jun. 7, 2012 as WO 2012/074481, which claims priority to application number 1051279-6 filed in Sweden on Dec. 3, 2010.

TECHNICAL FIELD OF THE INVENTION

The present invention relates to chromatographic separations and in particular to large-scale chromatographic separation of biopolymers such as monoclonal antibodies. More specifically it relates to a chromatography system with hold tanks and to a continuous or semi-continuous method of operating such a system.

BACKGROUND OF THE INVENTION

In the biopharmaceutical field, recent advancements in genetic engineering and cell culture technology have driven expression levels higher than ever, putting a considerable burden on down-stream purification, especially the capture step. While the introduction of new chromatography resins significantly improves the efficiency of a process based on a conventional fixed bed chromatography, additional gains can be achieved by operating in a continuous manner. The latter is especially appealing when continuous bioreactors, such as those operated in perfusion mode, are employed.

A typical process for downstream processing of monoclonal antibodies involves a capture step using a resin with protein A ligands to bind the antibodies with very high selectivity. This is a highly efficient step in that the majority of the impurities are removed here. However, due to the cost of the protein A resin, there is a strong incentive to optimize the efficiency, e.g. by chemical engineering methods that increase the utilization of the resin's binding capacity. After the protein A step, the antibodies are further purified in other chromatography steps, e.g. bind-elute cation exchange chromatography and/or in bind-elute or flow-through multi-modal or anion exchange chromatography. Also in these steps there is a need to increase the capacity utilization of the resins used, particularly when the steps are run in bind-elute mode.

In continuous chromatography, several identical columns are connected in an arrangement that allows columns to be operated in series and/or in parallel, depending on the method requirements. Thus, all columns can be run in principle simultaneously, but slightly shifted in method steps. The procedure can be repeated, so that each column is loaded, eluted, and regenerated several times in the process. Compared to 'conventional' chromatography, wherein a single chromatography cycle is based on several consecutive steps, such as loading, wash, elution and regeneration, in continuous chromatography based on multiple identical columns all these steps occur simultaneously but on different columns each. Continuous chromatography operation results in a better utilization of chromatography resin, reduced processing time and reduced buffer requirements, all of which benefits process economy. Continuous chromatography is sometimes denoted simulated moving bed (SMB) chromatography.

Bischops et al ("Simulated Moving Bed technology in Biopharmaceutical Processing", Bischops, M. and Pennings, M., Recovery Biological Products XI, (2003) Banff, Alberta, Canada) discloses a continuous chromatography method based on simulated moving bed (SMB) technology, which has been successfully employed for the laboratory scale purification of IgG with a protein A affinity resin. Despite the fact that the multi-column and multi-zone continuous approach provided by SMB greatly increases process efficiency, SMB systems have not been utilized to date for cGMP biopharmaceutical production, mainly because of system complexity from both hardware and operational perspectives.

Heeter et al (Heeter, G. A. and Liapis, A. I., J. Chrom A, 711 (1995)) has suggested, as an alternative to a typical four zone SMB system, a method based on a three column periodic counter-current chromatography (3C-PCC) principle. More recently, Lacki et al ("Protein A Counter-Current Chromatography for Continuous Antibody Purification", Lacki, K. M. and Bryntesson, L. M., ACS (2004) Anaheim, Calif. USA) described the use of such a 3C-PCC system for IgG adsorption to MABSELECT™ affinity resin. This 3C-PCC method requires simpler hardware and easier operation than the typical four zone SMB system, directly reducing the cost associated with the capital equipment and the maintenance of the system.

In fact, simulated moving bed technology has been utilised for decades in various other fields. For example, U.S. Pat. No. 3,291,726 (Universal Oil Products) described as early as 1966 a continuous simulated counter-current sorption process for the petrochemical industry. U.S. Pat. No. 6,280,623 (Ma) describes a complex rotating fluidised simulated moving bed arrangement for sweetener refining, with holding tanks but not adapted for chromatographic separations.

An essential factor for a reliable continuous process is the quality of the columns used, and more specifically the similarity or even identity between columns. If the columns are not identical, the theoretical calculations will not be correct, and it will become difficult to design an efficient and robust continuous chromatography process. Also, for scale-up considerations, having identical columns in the system is essential. However, the packing of a column with a chromatography media is very complex in order to obtain repeatable results. Even small differences in the number of plates or other packing properties can have a huge effect on the end result.

Although continuous chromatography methods like SMB and 3C-PCC have the potential to improve capacity utilization, they are complicated methods to set up and run, involving the control of a large number of valves and columns. Hence, there is a need for a simple and robust solution that increases capacity utilization compared to single column chromatography. In particular, there is a need for continuous and semi-continuous chromatography solutions that can be used in chromatography processes using disposable columns and flowpaths, which are today finding an increased use in pilot and small scale biopharmaceuticals production.

SUMMARY OF THE INVENTION

One aspect of the invention is to provide an efficient process for large scale chromatographic separation of biopolymers. This is achieved with a chromatography system and with a chromatography method.

One advantage with such a system and method is that they allow for semi-continuous and continuous chromatography to be operated in disposable bioprocessing systems. Another advantage is that they compensate for the mismatch between column loading and column regeneration that commonly occurs when high titer feeds are used in bioprocessing. A further advantage is that a single multichannel peristaltic pump can be used to achieve continuous operation.

Further suitable embodiments of the invention are described in the depending claims.

Figure 1:
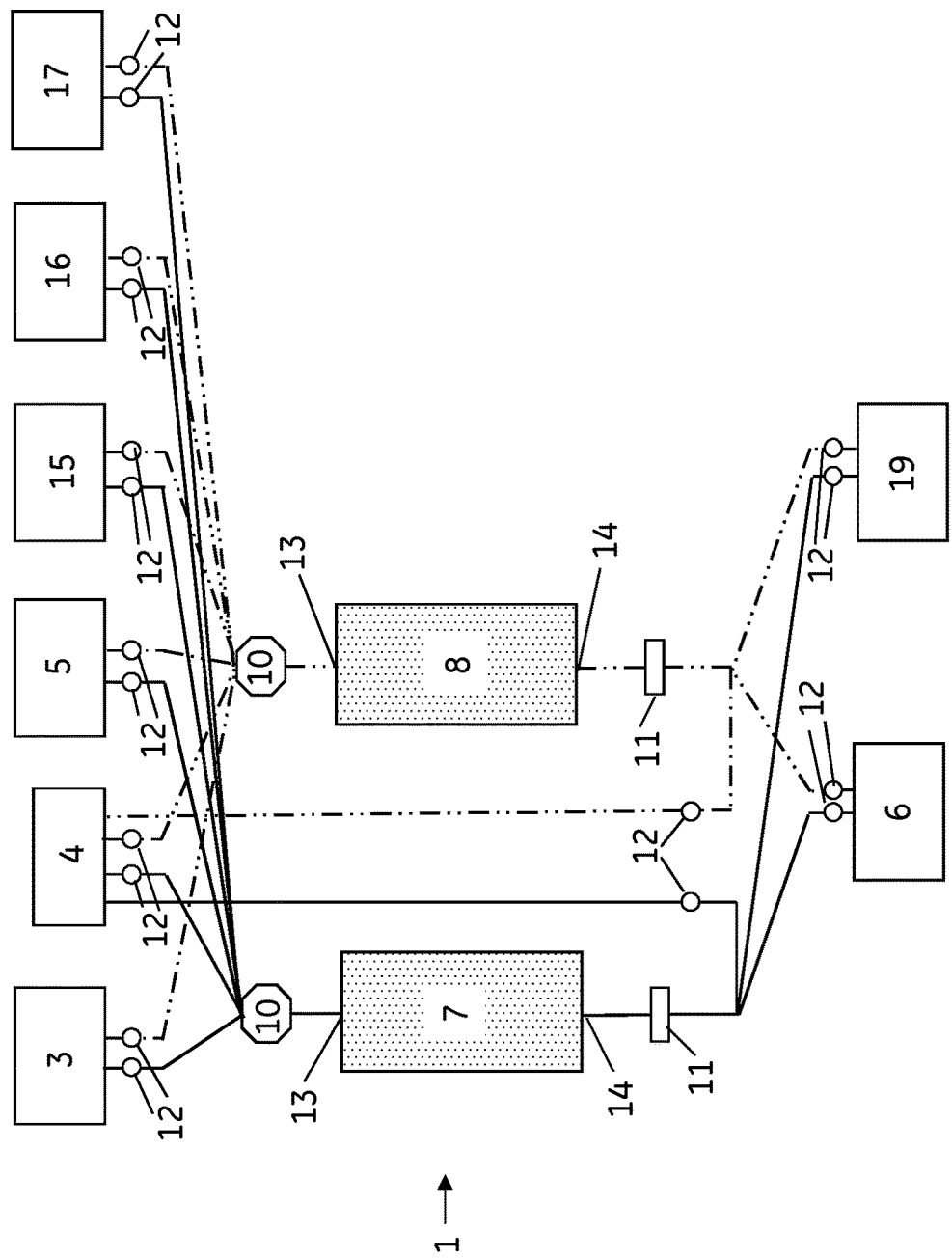
FIG. 1 shows a chromatography system with two columns according to the invention.
Figure 2:
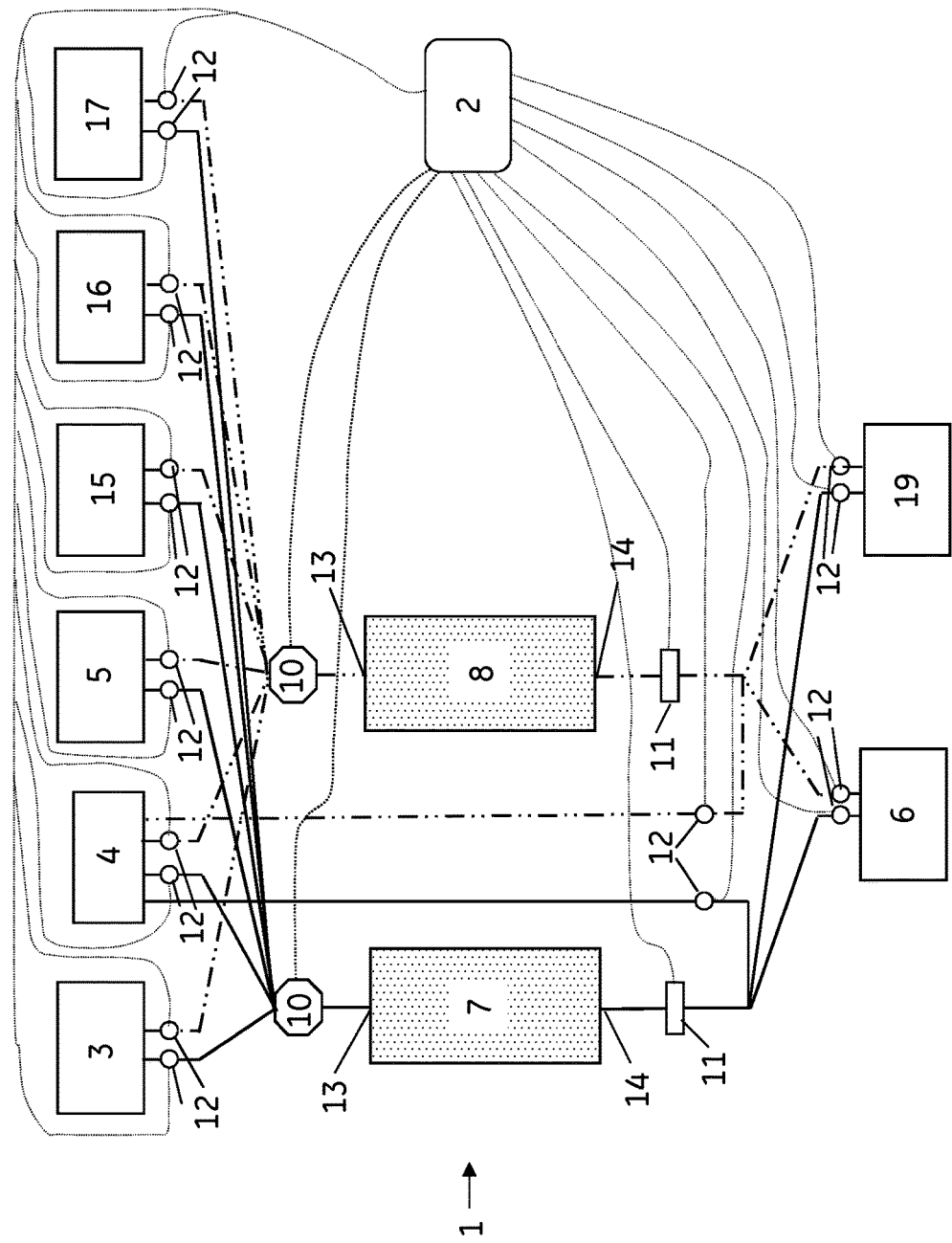
FIG. 2 shows a chromatography system with two columns and a control unit according to the invention.

a) feed (solid bold arrows) pumped through a first column to waste line;

b) feed delivered through first column to hold tank once the biopolymer concentration reaches level L1;

c) feed diverted to second column once the biopolymer concentration reaches level L2, and wash solution (dashed bold arrows) pumped through first column;

d) hold tank content mixed with feed and pumped through second column;

e) elution solution (dotted bold arrows) pumped through first column;

f) regeneration solution (dashed semi-bold arrows) pumped through first column, g) feed pumped through second column to hold tank;

h) feed pumped through first column and wash solution pumped through second column;

i) elution solution pumped through second column;

j) regeneration solution pumped through second column;

k) feed pumped through first column to hold tank;

l) wash solution pumped through first column to hold tank;

m) feed and hold tank content pumped through second column, while first column is washed;

n) first column is eluted;

o) first column is regenerated;

p) feed pumped through second column to hold tank;

q) second column is washed;

r) second column is eluted;

s) second column is regenerated, and;

t) feed pumped through first column to hold tank.

DEFINITIONS

The term "feed" herein means a liquid provided to a chromatography system and comprising a target species to be purified. The target species can be a biopolymer, such as a protein, e.g. a monoclonal antibody. Examples of feeds can be clarified fermentation broths, biological fluids etc. as well as liquids originating from a previous separation step and comprising a partially purified target species.

The term "biopolymer" herein means a peptide, protein, nucleic acid, oligosaccharide, polysaccharide or virus particle—native as well as biologically or synthetically modified—including fragments, multimers, aggregates, conjugates, fusion products etc.

The term "hold tank" herein means a vessel (e.g. a collapsible plastic bag, a rigid tank etc) connected to at least one inlet end of a column and to at least one outlet end of a column. It may be connected to the inlet end of one column and the outlet end of another column or it may be connected to both the inlet end and the outlet end of one column. It may also be connected to several column inlet and outlet ends. A hold tank can be connected to the column(s) via one or more valves, pumps, detectors and/or manifolds.

The term "pinch valve" herein means a device adapted to control or completely stop the flow through flexible tubing by constriction of the tubing. Pinch valves can e.g. be magnetically, electrically, pneumatically or hydraulically operated, but they can also be manually operated.

The term "clamp" herein means a manually operated pinch valve.

The term "pump" herein means either a separate pumping device or an individual channel in a multichannel pumping device, such as e.g. a multichannel peristaltic pump.

The term "packed bed chromatography column" herein means a column adapted to be packed with a particulate chromatography resin. A packed bed chromatography column can be axial or radial and may comprise a column tube, an inlet porous bed support and an outlet porous bed support, an inlet fluid distributor and an outlet fluid distributor. When packed with the chromatography resin, the resin bed can fill essentially the entire volume between the inlet and outlet porous bed supports.

DETAILED DESCRIPTION OF EMBODIMENTS

In one aspect illustrated by FIGS. 1-6 and 11-14, the present invention discloses a chromatography system (1) for separation of a biopolymer that comprises at least one feed tank 3, at least one hold tank 4; 4a, 4b, 4c; 40, at least one elution buffer tank 5, at least one eluate tank 6; 60, at least two packed bed chromatography columns 7,8; 70,80 and for each packed bed chromatography column at least one pump 10; 100 and at least one outlet detector 11;11a,11b both connected to said each packed bed chromatography column, wherein the feed tank, the hold tank(s), the elution buffer tank and the eluate tank are each connected to the packed bed chromatography columns via a system of valves 12; 120. As defined above, the hold tank(s) is/are connected to at least one inlet end 13; 130 of a column 7,8; 70,80 and at least one outlet end 14; 140 of a column 7,8; 70,80, e.g. via the system of valves 12; 120. In other words, at least two packed bed chromatography columns, each with an inlet end 13; 130 and an outlet end 14; 140, are provided and these columns are connected to at least one feed tank 3, at least one hold tank 4; 4a,4b,4c; 40, at least one elution buffer tank 5 and at least one eluate tank 6; 60 via a system of valves. Each packed bed chromatography column is also connected to at least one pump and at least one outlet detector. The pumps can be connected to the inlet ends of the columns and the outlet detectors can be connected to the outlet ends of the columns. The outlet detectors can be of any type suitable for monitoring the concentration of a biopolymer, e.g. UV absorption detectors, refractive index detectors, light scattering detectors etc. The hold tank(s) is/are used to temporarily holds parts of a liquid stream flowing between two columns, and which volume can be smaller than the total volume of any specific liquid processed in the system. Examples of hold tanks can be a plastic bag with one inlet and one outlet in which both outlets are used simultaneously for charging and discharging liquid after the tank is filled with a predefined volume, or a tank in which the composition is constantly changing.

In certain embodiments, illustrated by FIGS. 2-6, the system also comprises at least one control unit 2, which is electrically, pneumatically or hydraulically connected to the system of valves 12; 120 and optionally to the detectors 11; 11a,11b and/or the pumps 10; 100. An advantage of this is that the operation of the system can be automated. The control unit can be e.g. a computer, a programmable logic controller or any other digital or analogue unit capable of controlling a system of pumps and valves according to an algorithm and a set of input data. Although for simplicity no connections to the valves are shown in FIGS. 3-6 and 11-14, it is understood that the control unit 2 can be connected to the valves, pumps and detectors in all these embodiments.

In some embodiments the at least one hold tank 4;4a,4b, 4c; 40 is adapted to receive a fluid from an outlet end 14; 140 of a column 7,8; 70,80 and to convey fluid to the inlet end 13; 130 of another column 8,7; 80,70. The hold tank can then function as a temporary storage vessel to handle any mismatch in flow rates between the different columns. The hold tank can be smaller, e.g. at least about 50% smaller, than the feed and elution buffer tanks as it is only used for temporary storage. In certain embodiments the at least one hold tank 4; 4a,4b,4c; 40 is equipped with at least one level indicator (not shown). This/these level indicator(s) can be connected to the control unit and used to avoid overfilling of the hold tank(s), in particular in semi-continuous or discontinuous processes where the flow to the hold tank(s) can be temporarily stopped while the hold tank(s) are emptied. The level indicator(s) can be optical, conductometric, ultrasonic or gravimetric (e.g. a balance).

Figure 3:
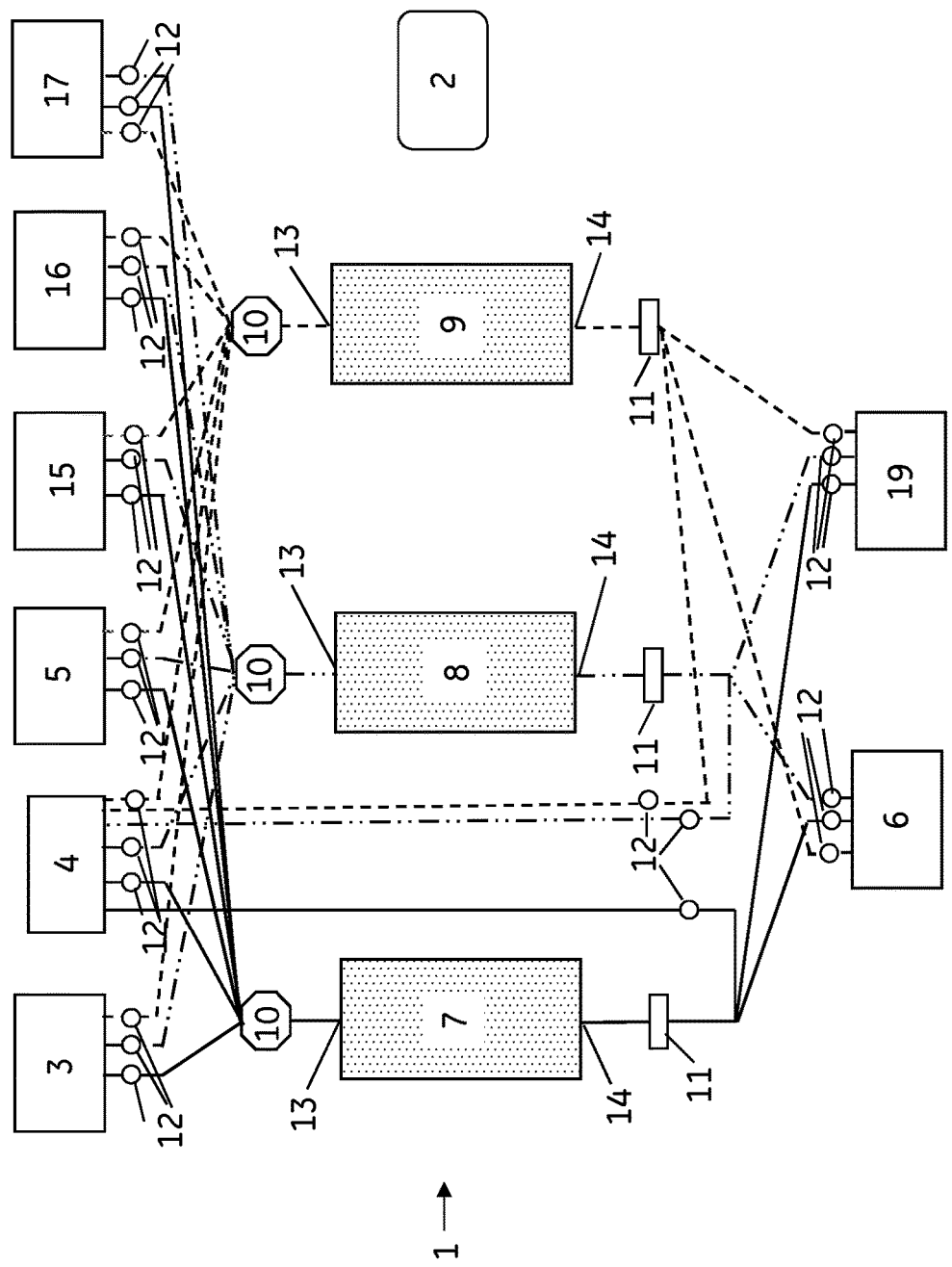
FIG. 3 shows a chromatography system with three columns according to the invention.
Figure 5:
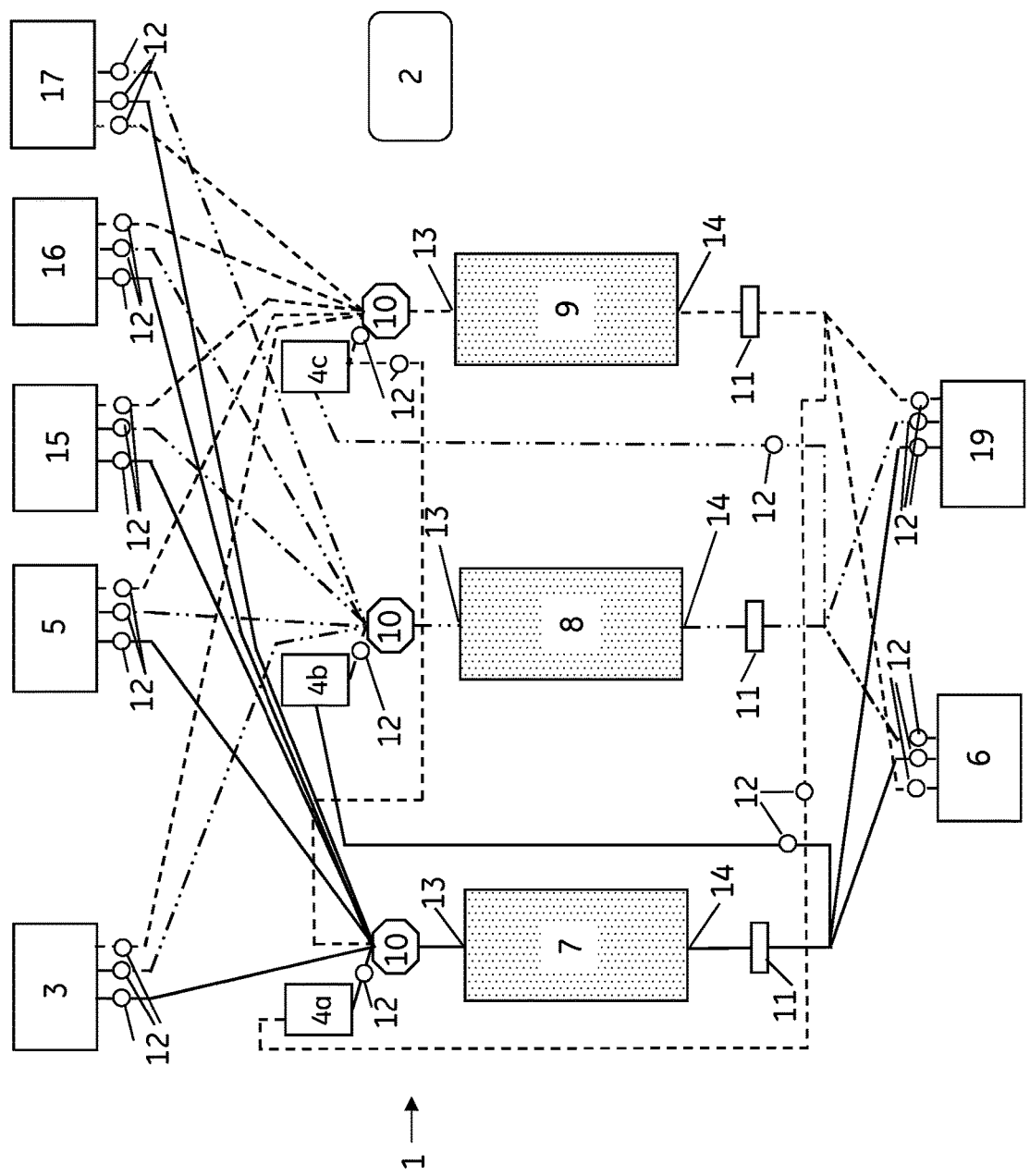
FIG. 5 shows a chromatography system with three columns and three hold tanks according to the invention.

In certain embodiments, as illustrated by FIGS. 3 and 5, the chromatography system comprises at least three, such as at least four or five columns. The columns can be connected and adapted for semi-continuous or continuous chromatography in e.g. three-column periodic counter-current mode or simulated moving bed mode.

In some embodiments, the chromatography system also comprises at least one equilibration buffer tank 15, at least one wash buffer tank 16 and/or at least one regeneration liquid tank 17.

Figure 4:
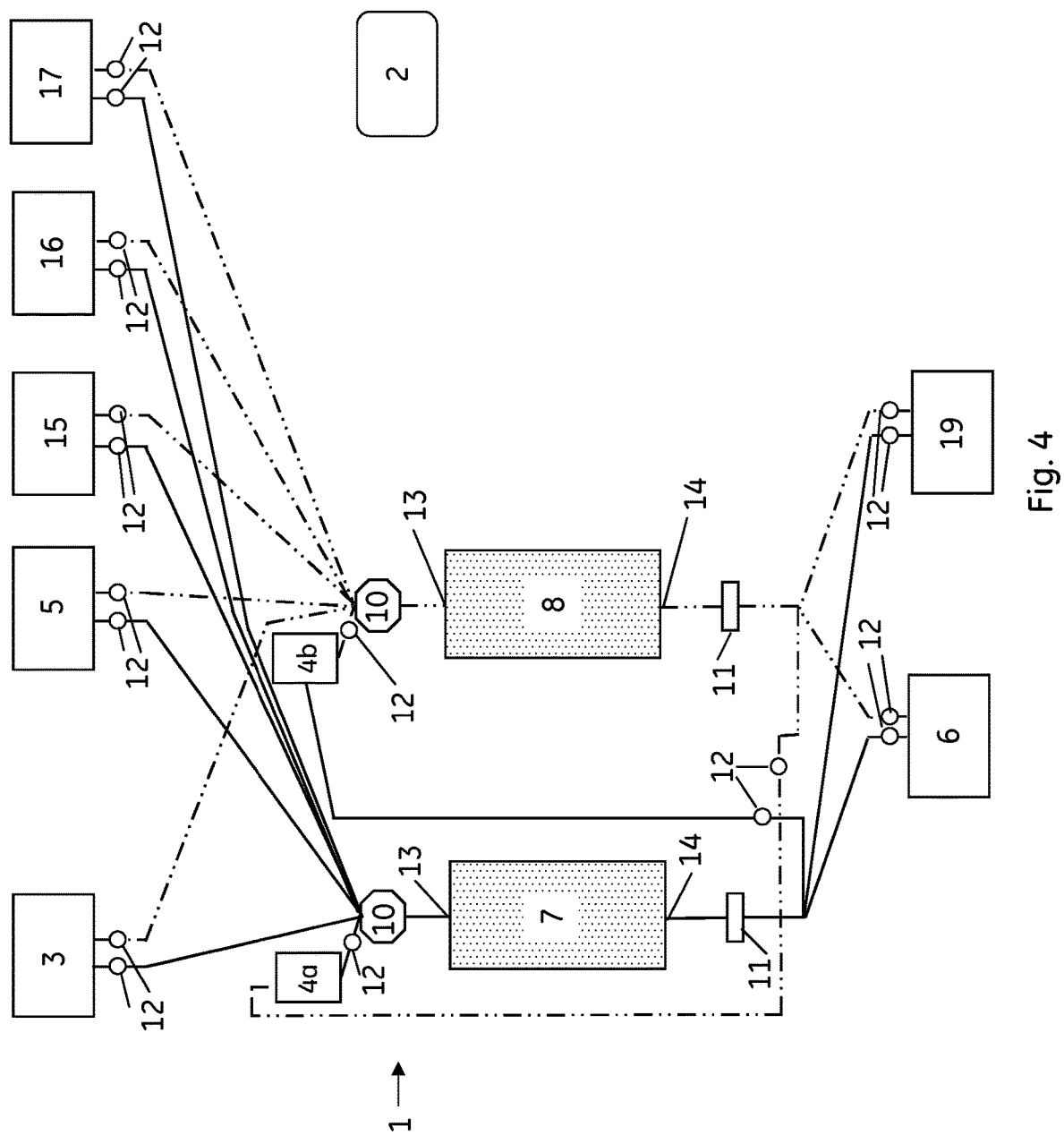
FIG. 4 shows a chromatography system with two columns and two hold tanks according to the invention.
Figure 6:
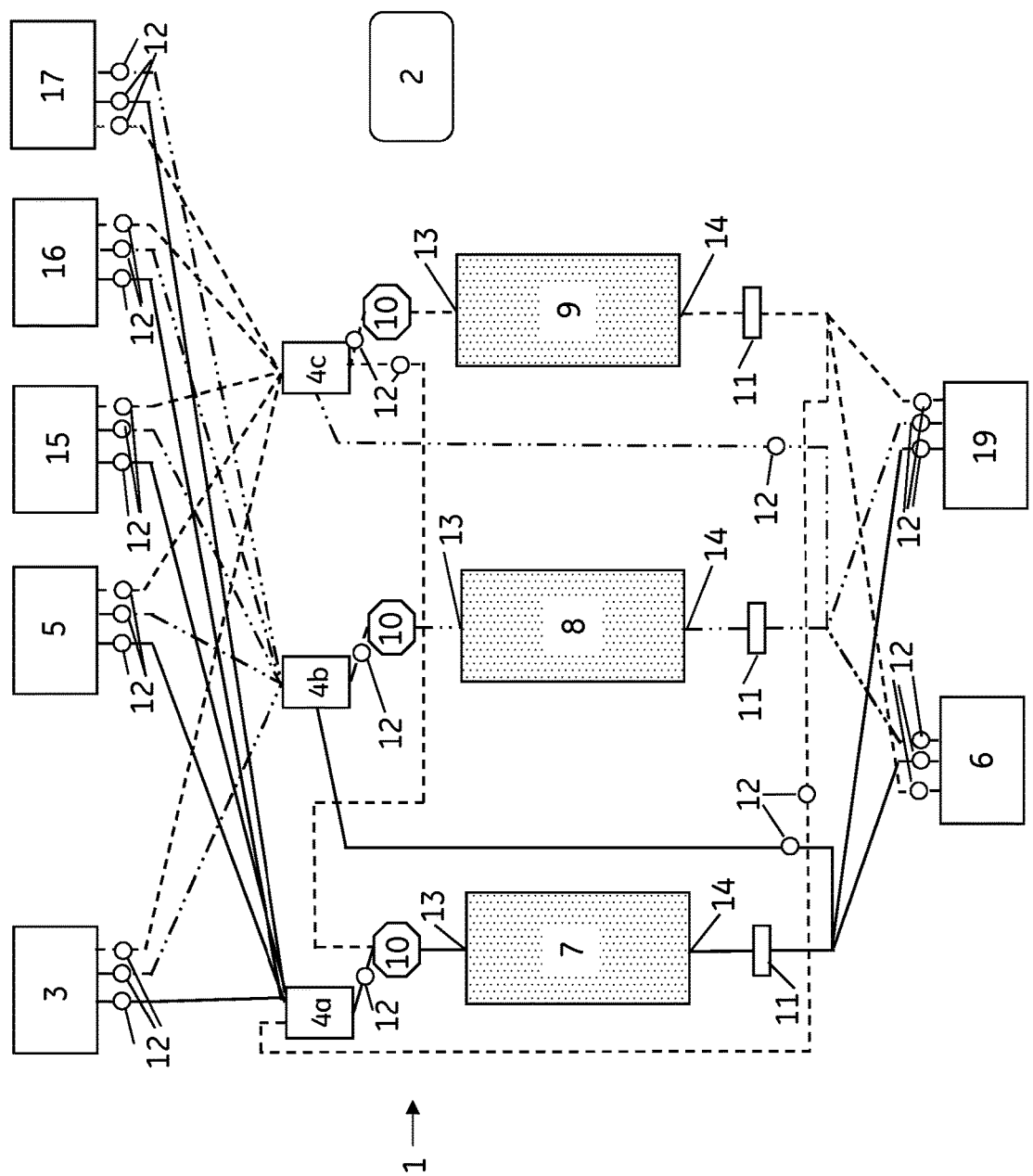
FIG. 6 shows a chromatography system with three columns and three hold tanks according to the invention.

In certain embodiments illustrated by FIGS. 4, 5 and 6, the chromatography system comprises at least one, such as one, hold tank 4a,4b; 4c; 40 per column 7,8; 9; 70,80. This has the advantage that continuous chromatography processes can be run without any stops to empty the hold tank(s). The feed 3, elution buffer 6, equilibration buffer 15 and wash buffer 16 tanks can be connected to the chromatography columns either directly via the pumps as in FIGS. 4 and 5 or via the hold tanks 4a,4b,4c and the pumps as in FIG. 6. The tanks can have several connection ports each or multiple lines can be connected via manifolds. The tanks can also have vent ports (not shown), e.g. equipped with vent filters to avoid contamination.

In some embodiments the packed bed chromatography columns are packed with a resin having affinity towards the biopolymer. In specific embodiments the resin comprises a proteinaceous ligand. An advantage of using a proteinaceous ligand is that very high specificities towards the biopolymer can be achieved. Packed bed chromatographic separation is also a process able to give very high resolution between components due to the high numbers of theoretical plates that can be achieved.

In some embodiments the proteinaceous ligand is derived from Protein A, Protein G, Protein L or an antibody. It can be either a native or recombinant protein A, G, L or antibody or it can be a mutant, fragment or multimer of any of these proteins or their binding domains. Such ligands can have very high selectivity and are hence suited for capture of valuable biopharmaceuticals from complex feeds. They are however also expensive and the resin with the ligand should be used as efficiently as possible.

In certain embodiments the pump(s), detectors and/or valves comprise disposable flow paths, such as disposable flow paths mounted in reusable units or housings. The disposable flow paths can comprise disposable tubing, connected to disposable columns or disposable resin cartridges in column housings and to disposable flowpath components in pumps, valves, detectors and transducers. A disposable flow path in a pump can be the tubing in a peristaltic pump, but it can also be e.g. a disposable membrane setup for a membrane pump or a disposable syringe for a syringe pump. Disposable flowpaths in valves can include the tubing in pinch valves, but also e.g. the flowpath components of disposable ball valves, diaphragm valves, one-way valves etc. In a detector, the disposable flowpath can be a transparent flow-through cuvette for optical detection (UV, refractive index, light scattering etc) and in a transducer it can be tubing or specially designed flowpaths for measurement of pressure, flow-rate, conductivity, temperature etc. The flowpath assembly may also comprise sanitary and or sterile connectors, so that parts of the flowpath may be presterilized and connected to form the entire assembly without external contamination.

In some embodiments the pump(s) comprise(s) peristaltic pump(s), such as multichannel peristaltic pump(s). Peristaltic pumps are convenient to use in disposable bioprocessing systems as they do not add any fluid-contact surfaces and they are well adapted to parallel conveying of fluids in that one pump head can be used with several tubes. It is possible to use only one multichannel pump for the entire system, but it is also possible to use several single- or multichannel pumps. If different flow rates are to be used in different lines, it is possible to use tubing of different diameters in the channels of a multichannel peristaltic pump. Further, it is possible to stop the flow in a separate line by releasing the compression of the tubing on the rollers of the pump.

In certain embodiments the valves 12; 120 comprise pinch valves such as clamps or pinch valves operated by e.g. magnetic, electrical, pneumatic or hydraulic actuation. Pinch valves are commonly used in disposable bioprocessing because they can be mounted directly on the flexible tubing flowpaths with no additional fluid-contact surfaces. They are however not currently used in continuous or semi-continuous chromatography, as they are only adapted for closing/opening a flow path or regulating the flow rate in the path. Continuous and semi-continuous chromatography has hitherto relied on valves that are able to selectively direct flow into a plurality of branching flowpaths, i.e. multipath valves such as rotary valves and slide valves. With the hold tank(s) of the invention it is however possible to conduct continuous/semi-continuous chromatography using pinch valves.

In some embodiments the valves do not comprise rotary valves, slide valves or other components with moving parts in contact with the liquids. Rotary valves and slide valves are not easily adaptable to disposable bioprocessing in that they have complex precision engineering liquid contact parts.

In certain embodiments one or more of the tanks 3,4,4a,4b,4c,5,6,15,16,17,18; 40,60, such as all the tanks, comprise collapsible bags. Bags are highly useful tank constructions in disposable bioprocessing, as they are cheap, can easily be presterilized and take up small storage space when folded before and after use.

Figure 12:
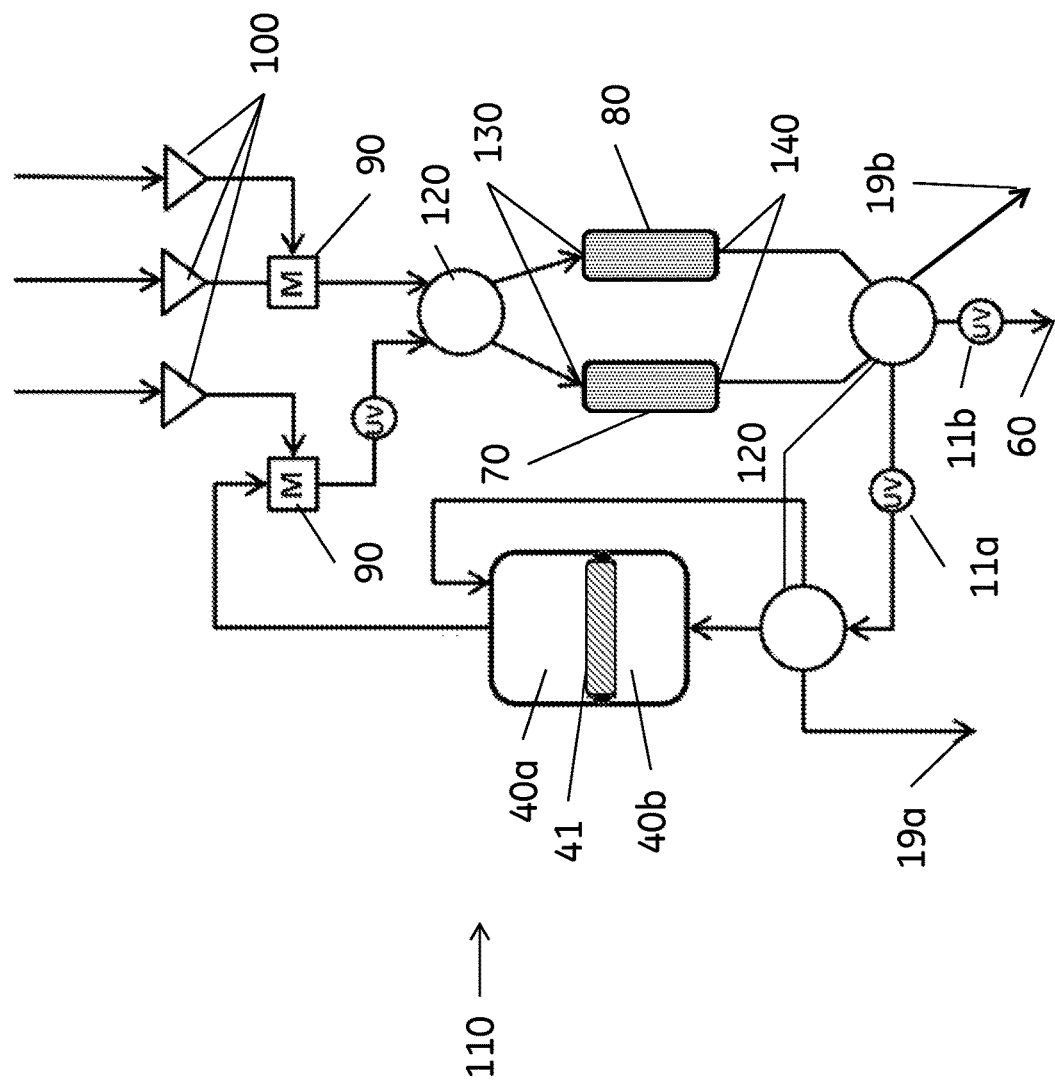
FIG. 12 shows a chromatography system with two columns and a two-compartment hold tank according to the invention.
Figure 13:
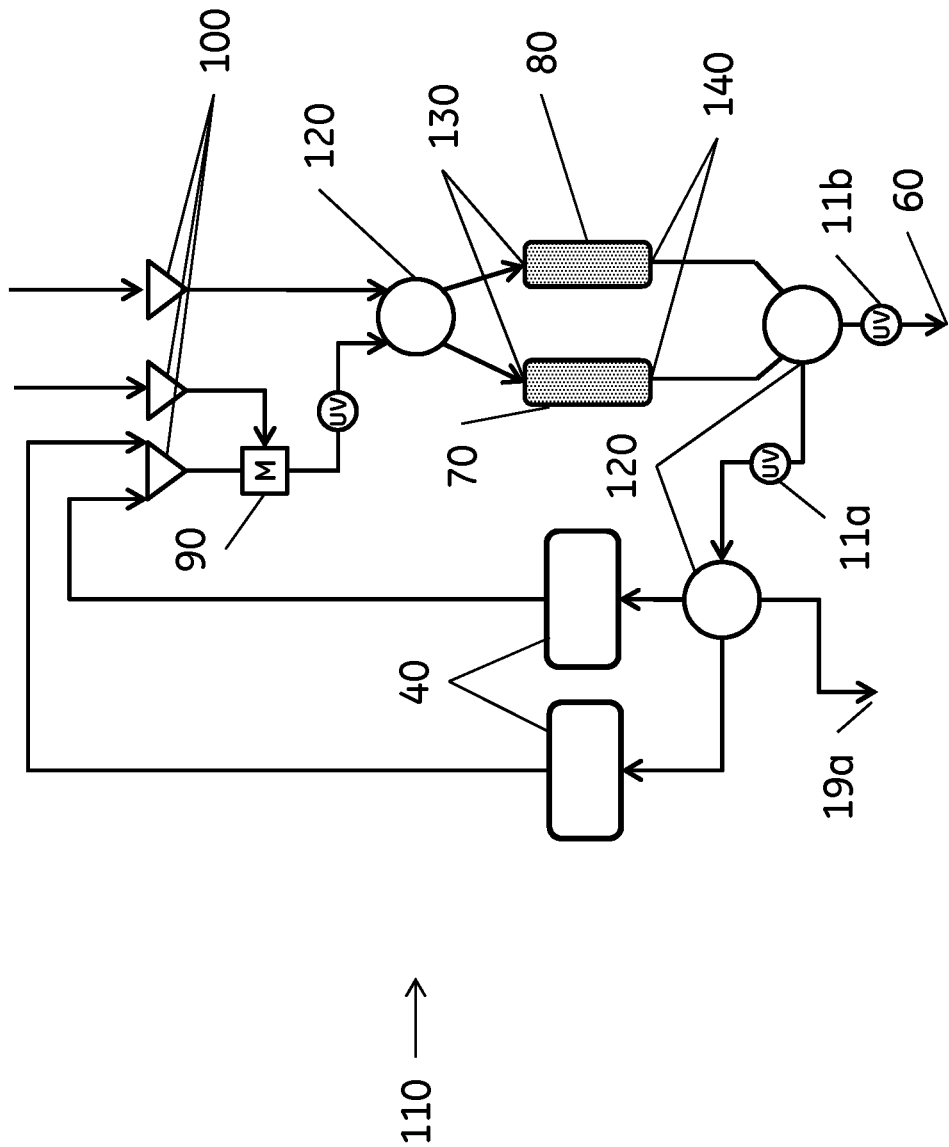
FIG. 13 shows a chromatography system with two columns and two hold tanks according to the invention.
Figure 14:
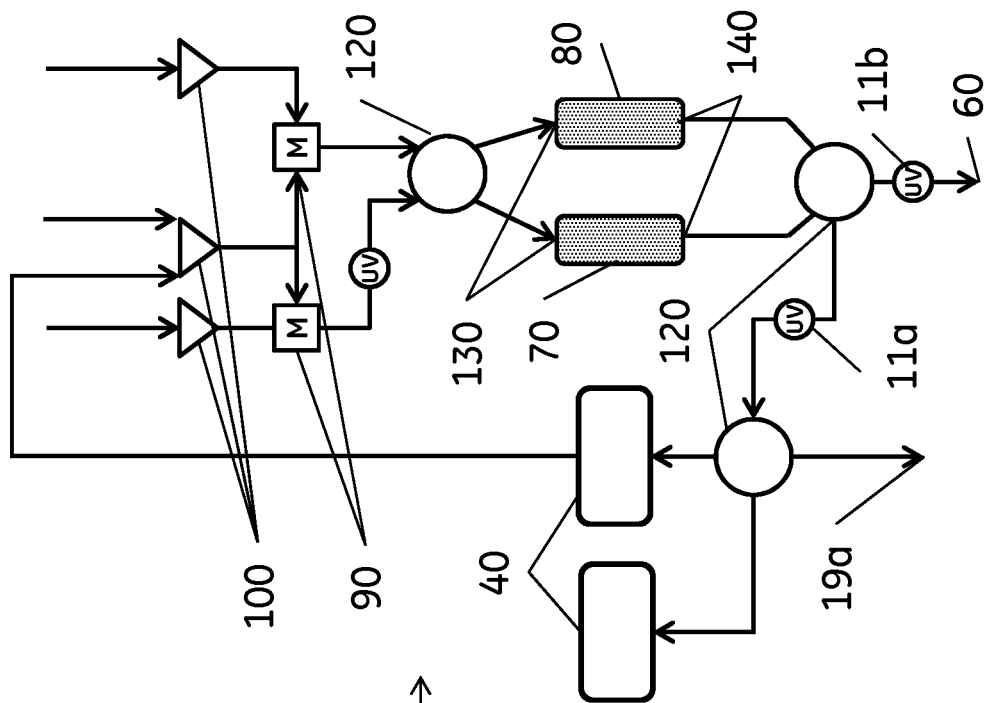
FIG. 14 shows two alternative chromatography systems according to the invention.
Figure 14:
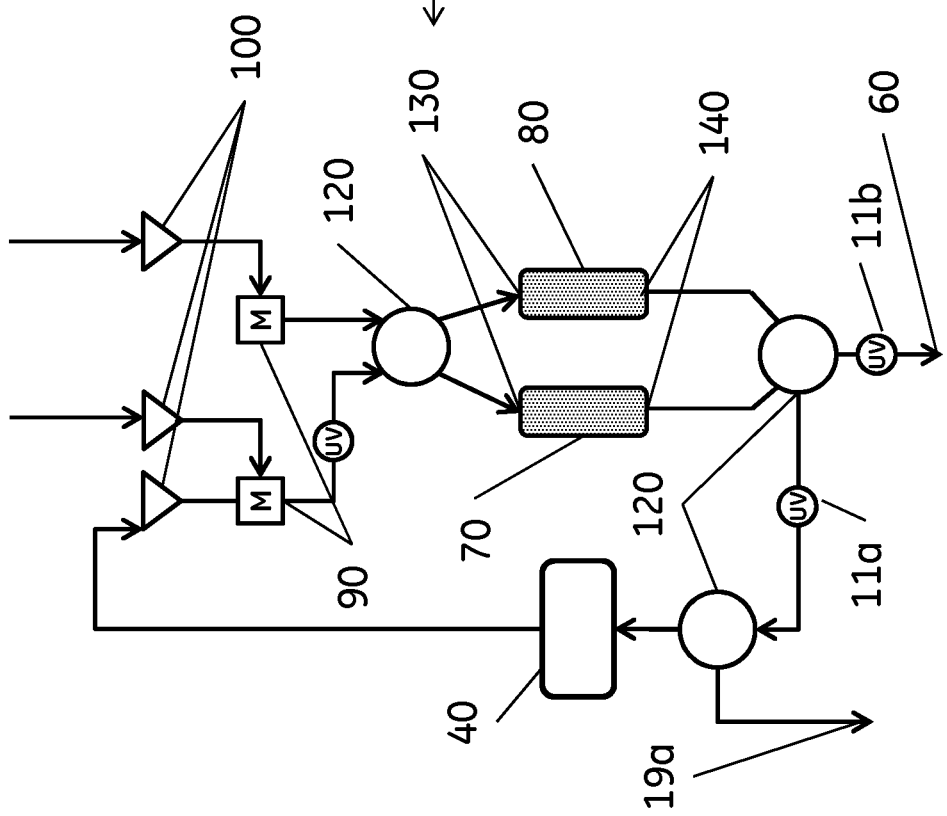
Figure 15:
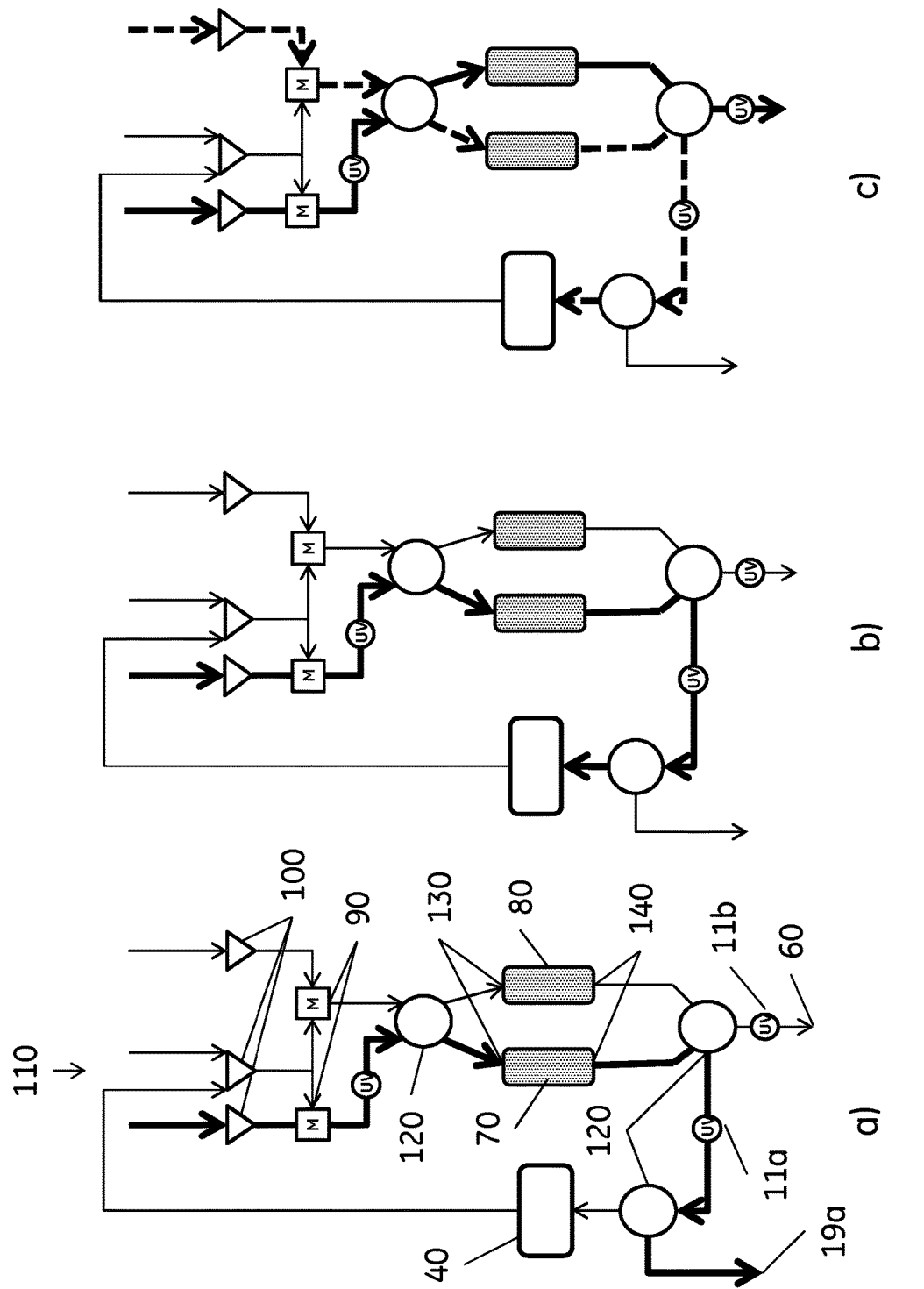
FIG. 15 shows a chromatography system with two columns and one hold tank according to the invention (reference signs only shown in a)), during use.
Figure 15:
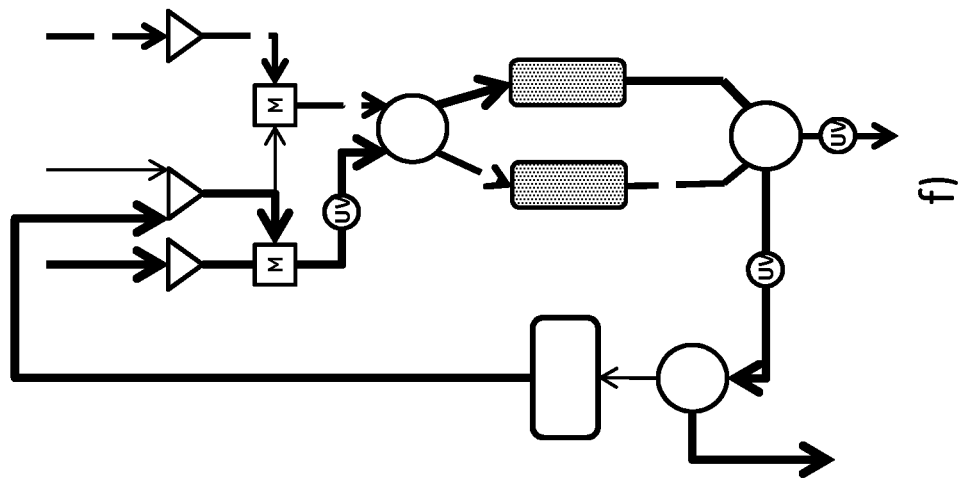
Figure 15:
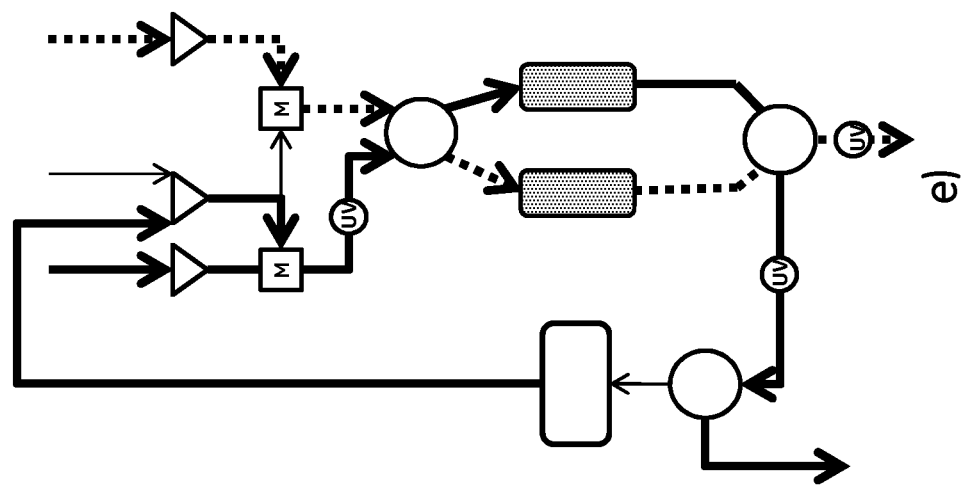
Figure 15:
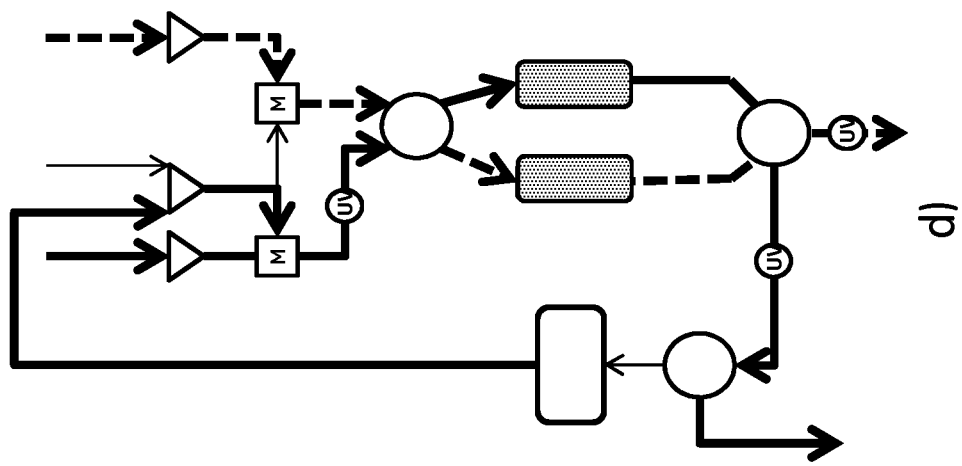
Figure 15:
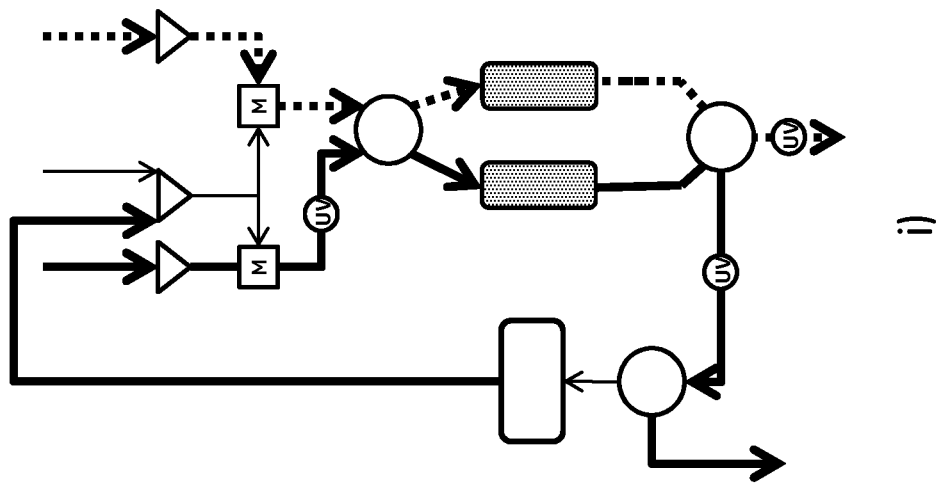
Figure 15:
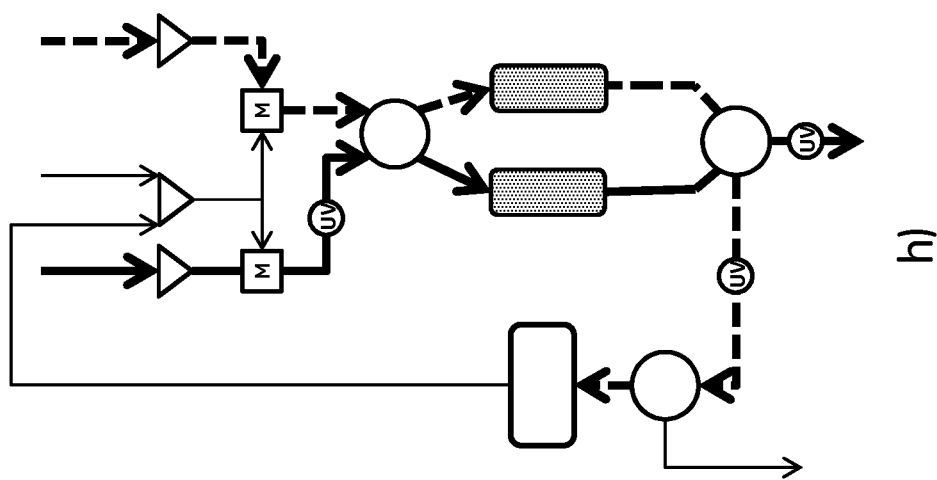
Figure 15:
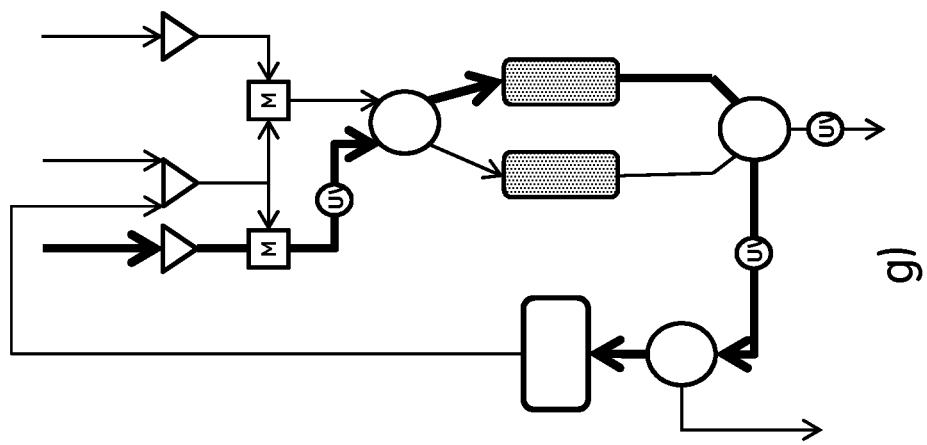
Figure 15:
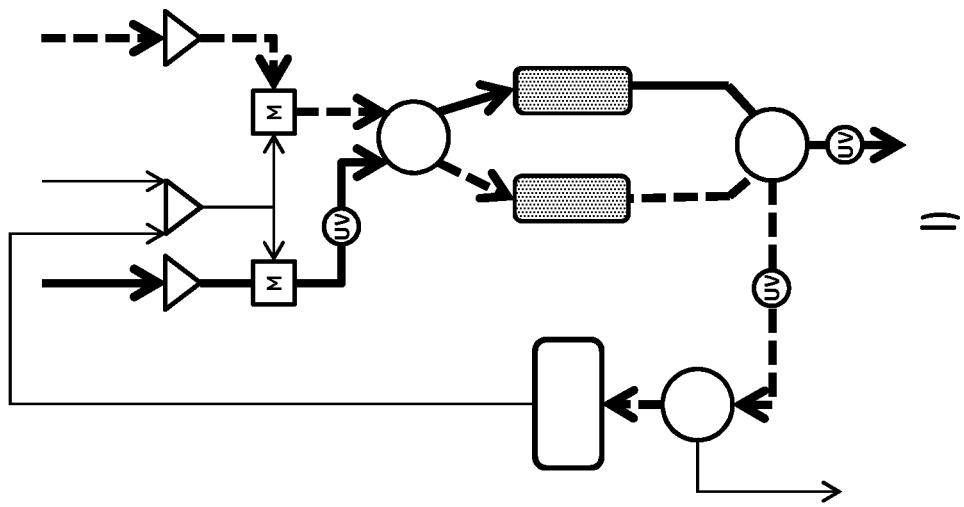
Figure 15:
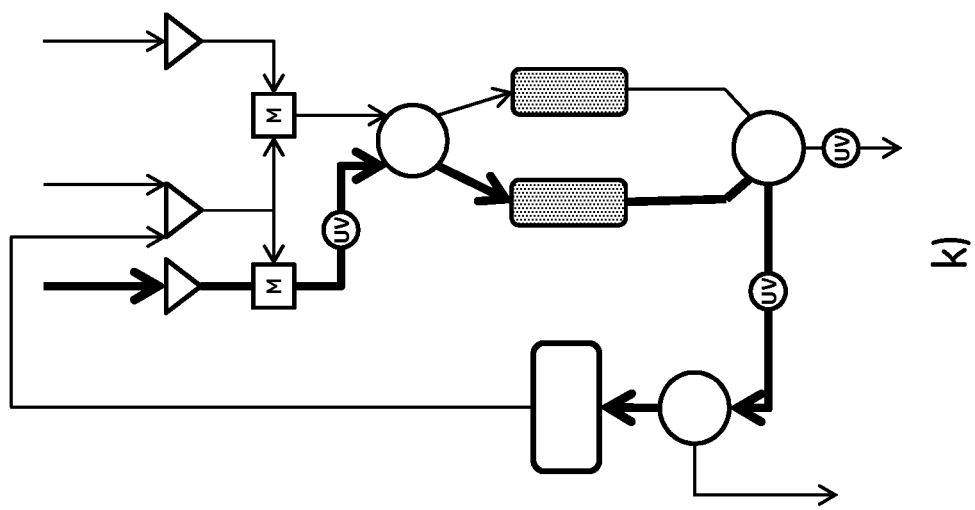
Figure 15:
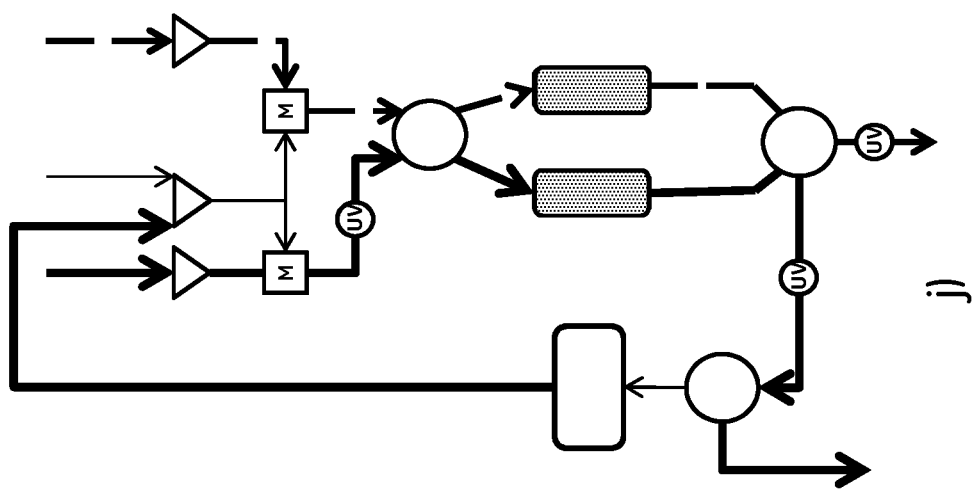
Figure 15:
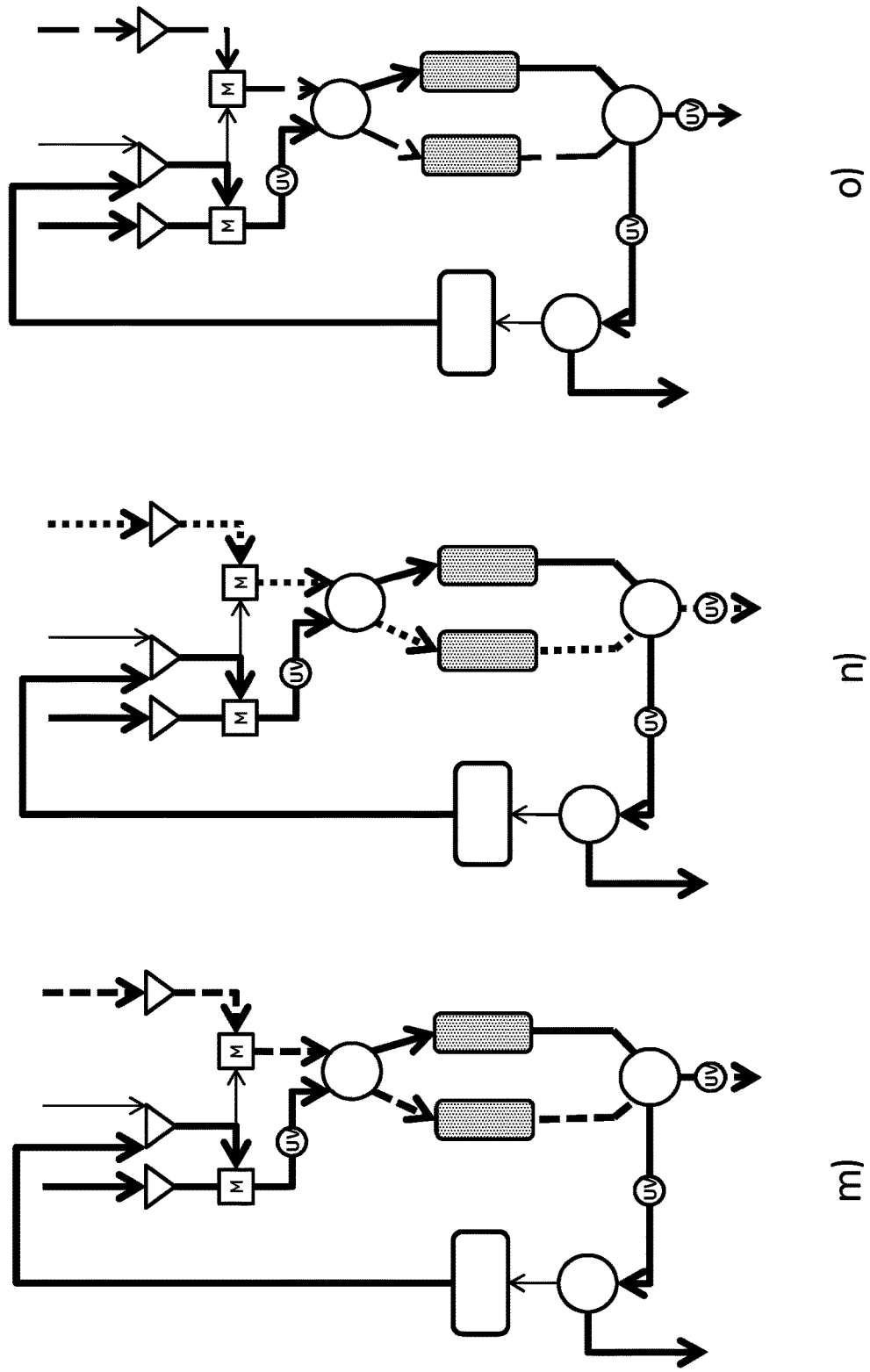
Figure 15:
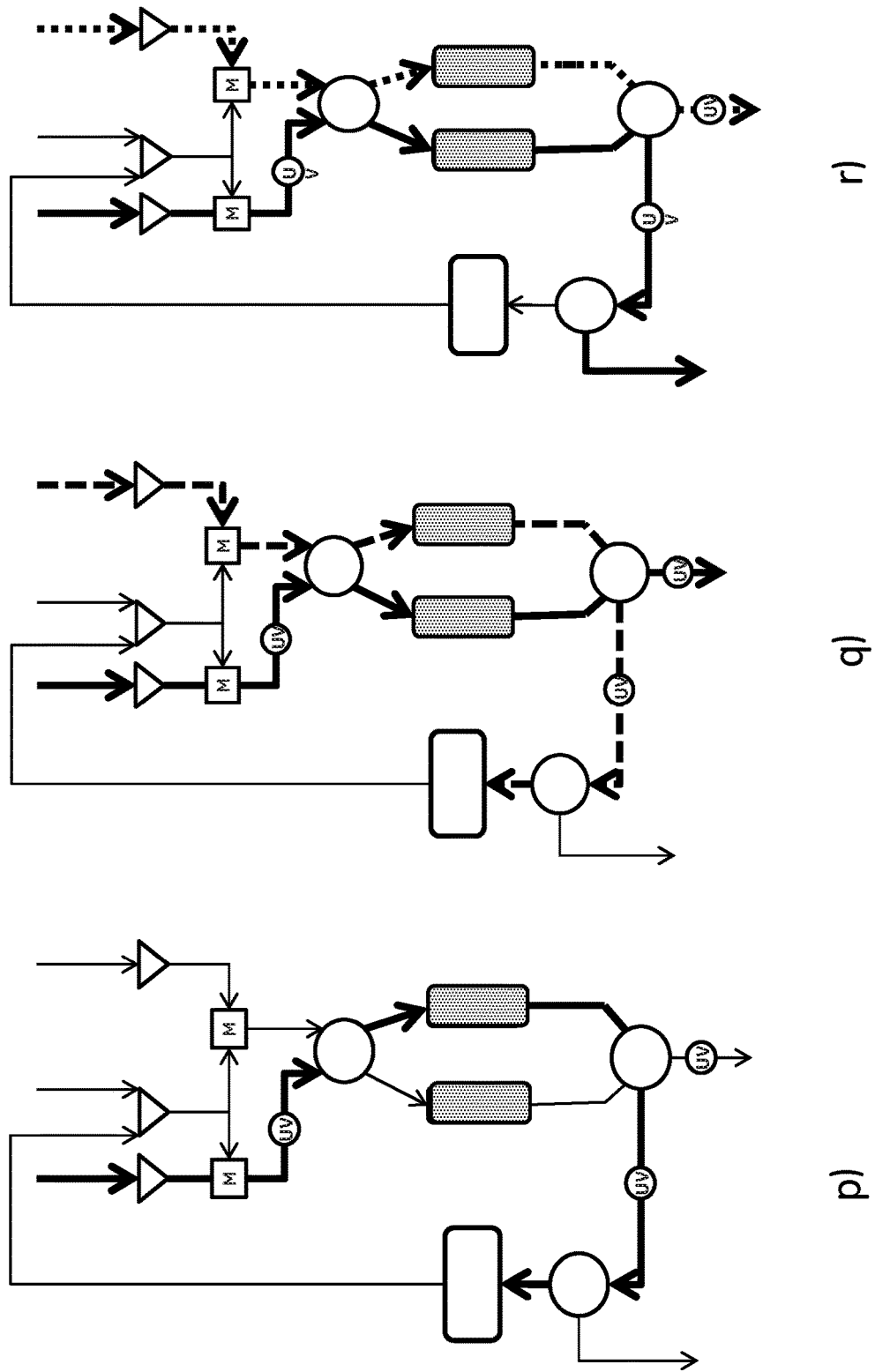

In some embodiments, illustrated by FIG. 12, the at least one hold tank comprises a first compartment 40a and a second compartment 40b, delimited from each other by a movable or flexible seal 41 and wherein said first compartment and said second compartment are both fluidically connected to said at least two columns via a system of valves. The first compartment can suitably be fluidically connected to the inlet ends of the at least two columns and the second compartment can be fluidically connected to the outlet ends of the at least two columns.

The movable/flexible seal allows operation under conditions where one liquid is pumped into one of the compartments and simultaneously another liquid in the other compartment is displaced out of the other compartment. In a specific embodiment the at least one hold tank is generally cylindrical and said movable or flexible seal is in slidable sealing abutment with a side wall of said hold tank. Alternatively, the movable or flexible seal is a flexible diaphragm, optionally comprising a flexible plastic film.

In some embodiments the chromatography system is used for separation of a biopolymer. The system is particularly useful for this purpose in that the presence of the hold tank(s) allows for easy operation in high-efficiency continuous or semi-continuous modes, where the different phases of the separation process are likely to require different flow rates and the hold tanks act as buffer reservoirs to accommodate liquids between the columns.

In one aspect, illustrated by FIGS. 1-6 and 8, the present invention discloses a method for chromatographic separation of a target biopolymer in a chromatography system 1; 110 which comprises at least one hold tank 4; 4a,4b,4c; 40, connected to at least one inlet end 13; 130 and at least one outlet end 14; 140 of at least two columns 7,8; 70,80 packed with a resin having affinity towards said target biopolymer and for each column at least one pump 10; 100 and at least one outlet detector 11; 11a,11b. The method comprises the steps of:
a) providing a feed comprising the target biopolymer and pumping the feed through a first column 7; 70 to either an eluate tank 6; 60 or a waste line 19; 19a,19b while monitoring the biopolymer concentration with a first outlet detector,
b) directing the flow from the outlet detector to a hold tank 4; 4b; 40 once the biopolymer concentration reaches a first predetermined level L1 and
c) pumping the content of the hold tank to a second column 8; 80 with a second outlet detector for further separation.

In some embodiments step c) can be conducted while maintaining the flow of the feed through the first column 7; 70 until the biopolymer concentration reaches a second predetermined level L2 as measured by the outlet detector connected to the first column. The feed can then be directed from the feed tank 3 via the hold tank 4; 4b; 40 to the second column 8; 80.

In certain embodiments the biopolymer is an impurity to be removed, such as a biopolymer selected from the group of host cell proteins, DNA, leached proteinaceous ligands, virus particles and antibody aggregates. The feed can then in step a) be pumped through the first column to the eluate tank 6; 60. The method of the invention is suitable for using in flow-through removal of contaminants in bioprocessing of e.g. monoclonal antibodies. In this case, the method can suitably be applied in a polishing step, i.e. after a capture step using e.g. affinity chromatography with protein A or another proteinaceous ligand. For removal of residual impurities such as host cell proteins, host cell DNA, protein A residues, viruses and/or aggregated antibodies, a multimodal resin, an anion exchange resin, a HIC resin or hydroxyapatite may be used in flow-through mode, where the antibody is collected in the flow-through and the contaminants are bound to the resin. In some embodiments the resin is selected from the group consisting of multimodal resins, ion exchange resins, HIC resins and apatite. In an advantageous embodiment, a multimodal anion exchange resin such as CAPTO™ adhere (GE Healthcare) is used.

Figure 9:
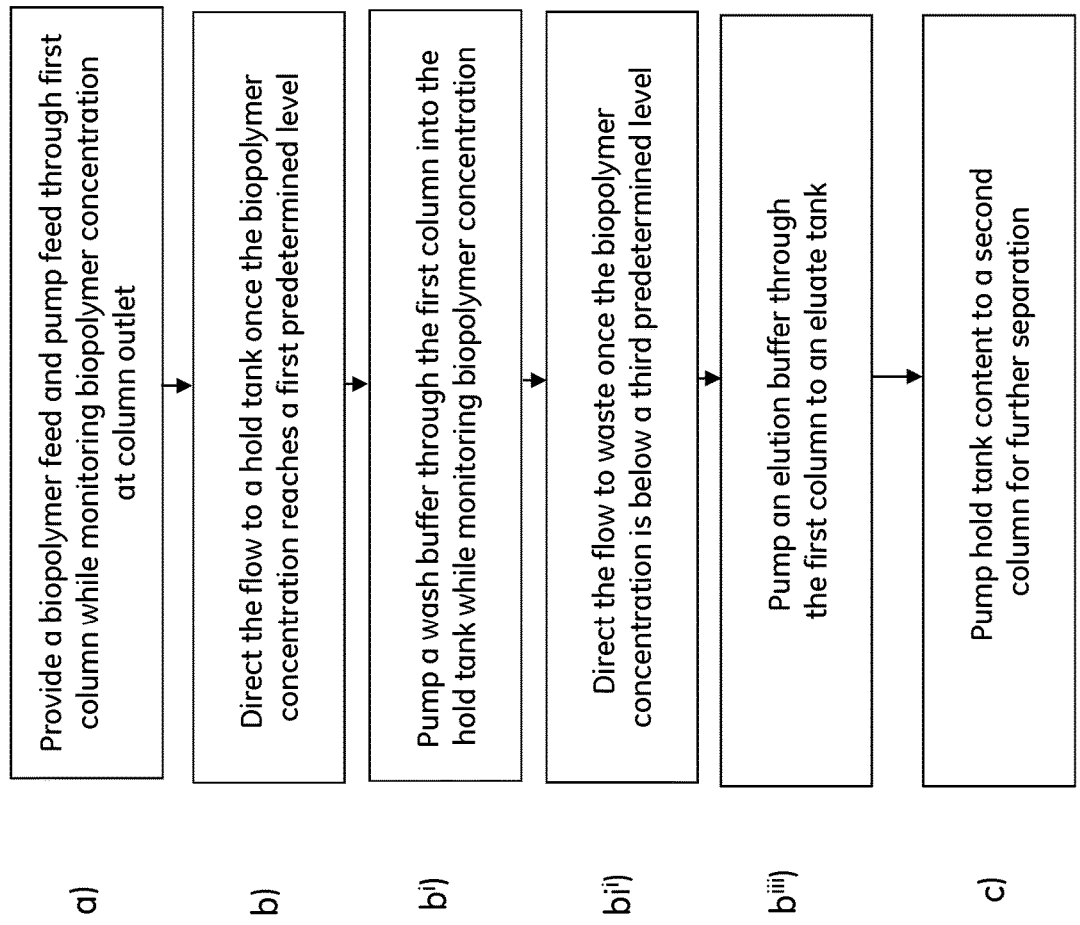
FIG. 9 shows a method for chromatographic separation according to the invention.

In certain embodiments further illustrated by FIG. 9 the method also comprises the steps of
$b^i$) providing a wash buffer and pumping the wash buffer through the first column 7; 70 and the first outlet detector into the hold tank 4; 4b; 40 while monitoring the biopolymer concentration with the first outlet detector,
$b^{ii}$) directing the flow from the first outlet detector to a waste receptacle once the biopolymer concentration is below a third predetermined level L3,
$b^{iii}$) providing an elution buffer and pumping the elution buffer through the first column to an eluate tank 6; 60.

In these embodiments, the feed can in step a) be pumped through the first column to the waste line or waste receptacle 19; 19a,19b.

The method can also comprise a step of pumping a column regeneration solution through the first column 7 into a waste line or waste receptacle 19; 19a,19b. It can also before step $b^i$ comprise a step of terminating the flow of feed to the first column 7; 70 once the biopolymer concentration reaches a second predetermined level.

Figure 7:
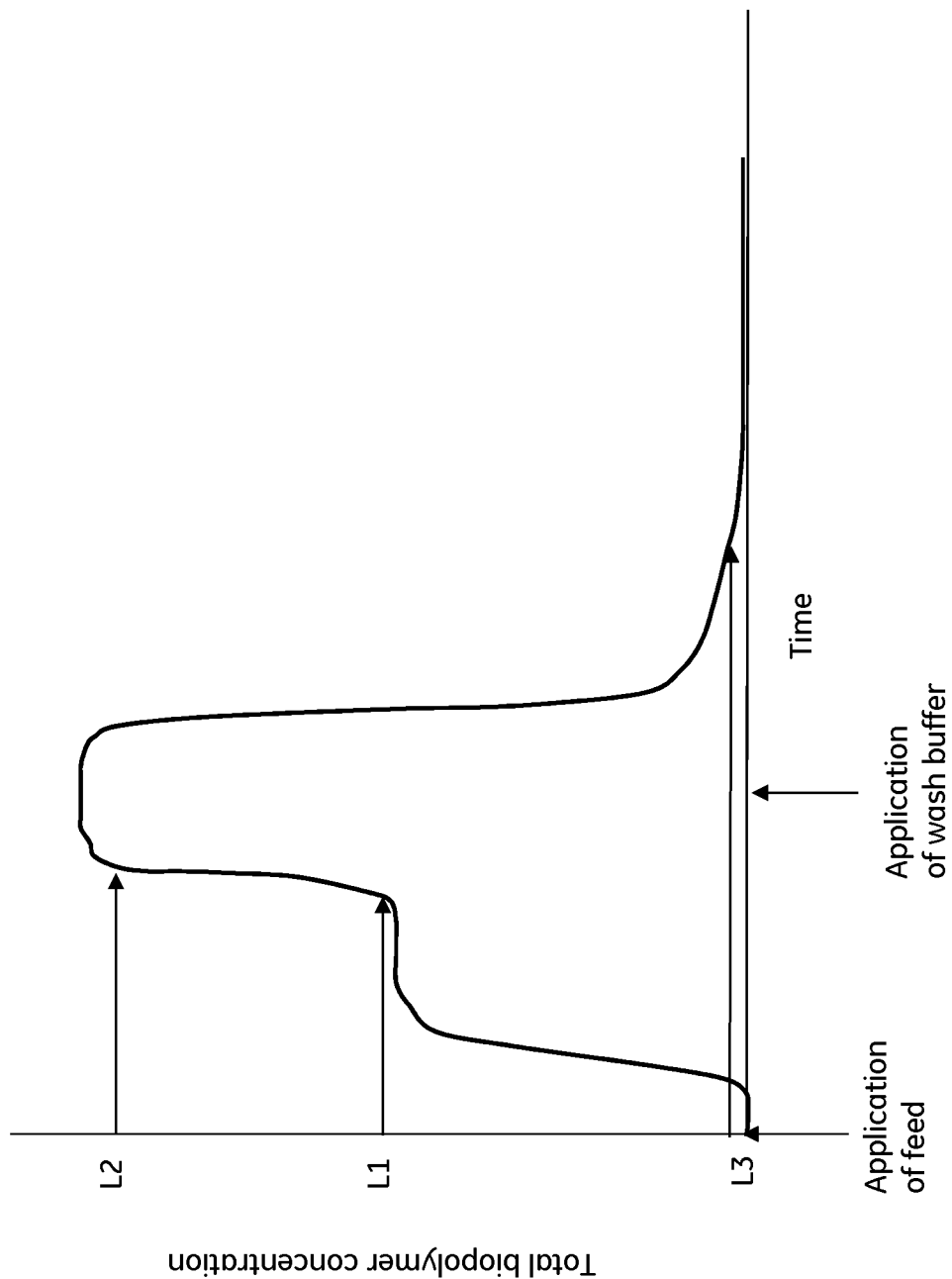
FIG. 7 shows the principles for setting predetermined concentration levels.
Figure 8:
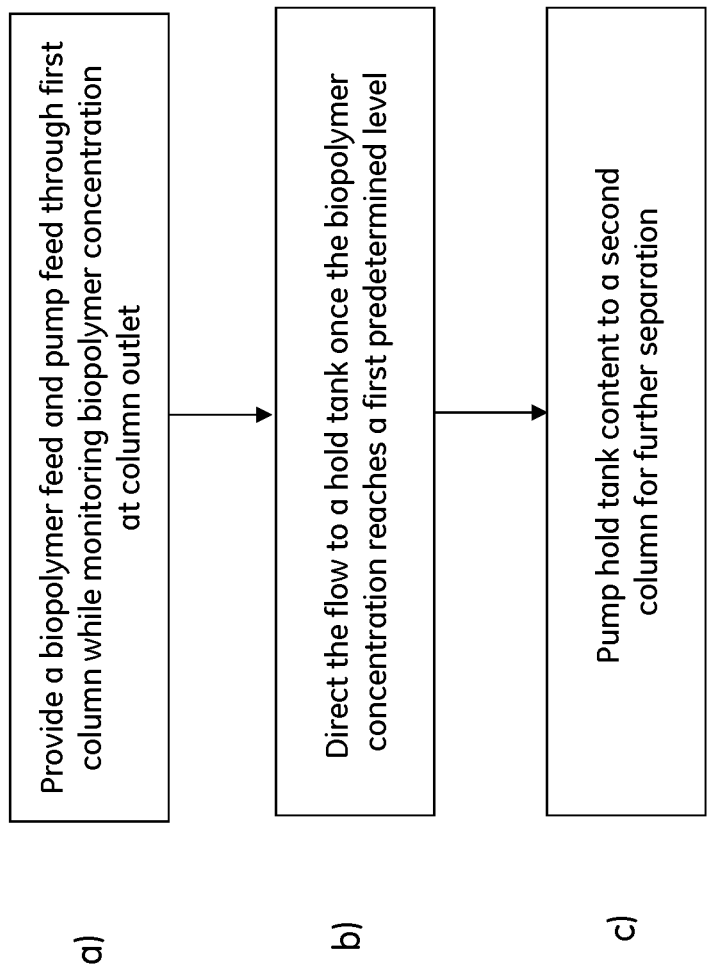
FIG. 8. shows a method for chromatographic separation according to the invention.

The predetermined biopolymer concentration levels L1,L2,L3 can be determined as illustrated in FIG. 7, which shows a typical response curve vs. time for a total biopolymer concentration detector, e.g. a UV absorbance detector. When the feed is loaded on a column, non-adsorbing biopolymers will be detected first and reach some form of plateau level (the first plateau in the curve). Then as the binding sites for the adsorbing biopolymer get saturated, the adsorbing biopolymer will be detected. The first predetermined biopolymer concentration level L1 can be set to the point which corresponds to e.g. 1%, 5% or 10% of the adsorbing biopolymer concentration in the feed. At this level the biopolymer concentration is too high to allow the outlet stream to go to waste and the outlet stream is instead diverted to a hold tank for further processing. As more feed is loaded on the column, a second plateau level will be reached, where all the binding sites are saturated and the concentration of the adsorbing biopolymer in the outlet will equal the concentration in the feed. The second predetermined biopolymer concentration level L2 can be set to the point which corresponds to e.g. 70%, 80% or 90% of the adsorbing biopolymer concentration in the feed. At this level almost all the binding sites are saturated and it is more efficient to divert the feed flow to the second column via a hold tank. After L2 has been reached, wash buffer can be supplied to the first column and as the non-adsorbing biopolymers are washed out, the total biopolymer concentration at the outlet will decrease to near zero. The third predetermined biopolymer concentration level L3 can be set to the point which corresponds to e.g. 0.01%, 0.1% or 0.5% of the biopolymer concentration in the feed. At this level essentially no non-adsorbing biopolymers remain and the elution of the first column can start, optionally after supplying a further predetermined amount of wash buffer to the first column. The skilled person will realize that the levels L1, L2 and L3 also can be determined in analogue ways using other types of outlet detectors, e.g. a detector that specifically detects the adsorbing biopolymer. Further, it is also possible to direct the flows based on predetermined times or collected liquid volumes, which according to earlier experience are expected to correspond to the points when the biopolymer concentration is approximately at L1, L2 and L3.

In some embodiments the biopolymer is a biopharmaceutical, such as a plasmid, a vaccine or a protein selected from the group of immunoglobulins, monoclonal antibodies, antibody fragments, insulin, coagulation factors and erythropoietin. These biopolymers can be separated by the method of the invention in bind-elute mode, where the biopolymer binds to the resin during loading and is desorbed by the elution buffer and recovered in the eluate tank.

In certain embodiments the resin is an affinity resin, such as a resin comprising a proteinaceous ligand. These resins can suitably be used in bind-elute mode with the method of the invention.

Figure 10:
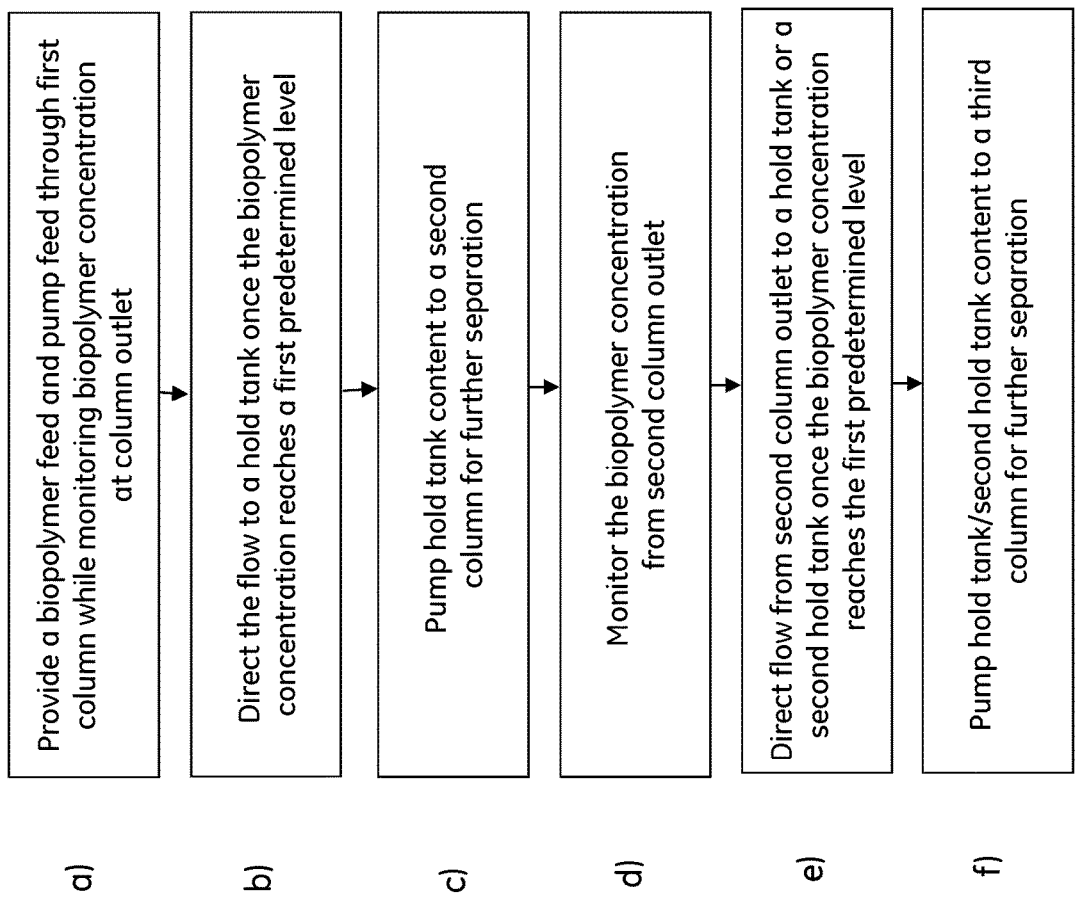
FIG. 10 shows a method for chromatographic separation according to the invention.
Figure 11:
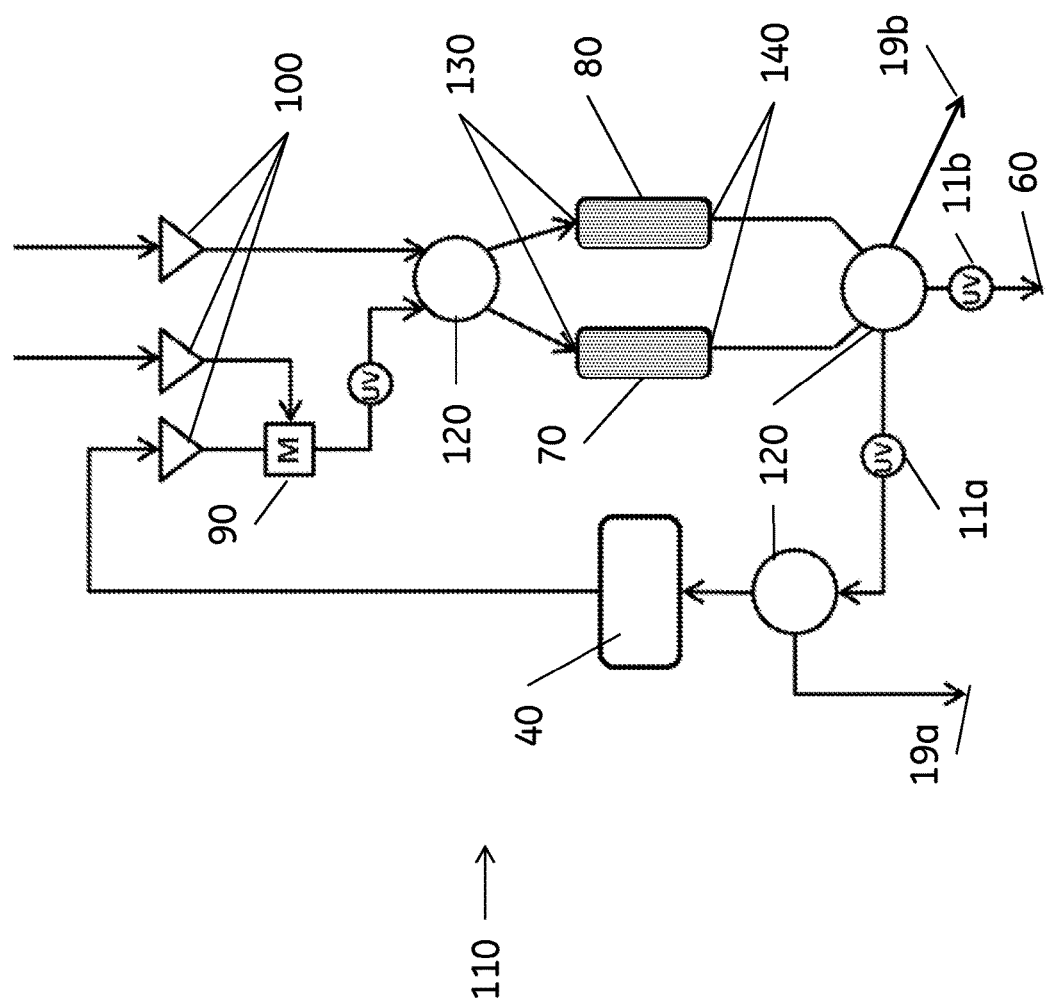
FIG. 11 shows a chromatography system with two columns and one hold tank according to the invention.

In some embodiments further illustrated by FIG. 10 the method also comprises the steps of
d) monitoring the concentration of the biopolymer from the second column 8 with the second outlet detector,
e) directing the flow from the second outlet detector to the hold tank 4; 4b or to a second hold tank 4c once the biopolymer concentration reaches the first predetermined level L1 and
f) pumping the content of the second hold tank 4c to either a third column 9 with a third outlet detector or to the first column 7 for further separation.

In certain embodiments the method also comprises the steps of
$e^i$) pumping the wash buffer through the second column 8 and the second outlet detector into the hold tank 4; 4b or the second hold tank 4c while monitoring the biopolymer concentration with the second outlet detector,
$e^{ii}$) directing the flow from the second outlet detector to a waste receptacle 19 once the biopolymer concentration is below the third predetermined level L3,
$e^{iii}$) pumping the elution buffer through the second column 8 to an eluate tank.

In some embodiments the method comprises before step $e^i$ a step of terminating the flow of feed into the second column 8 when the biopolymer concentration reaches the second predetermined level L2.

In certain embodiments at least one hold tank 40 comprises a first compartment 40a and a second compartment 40b, delimited from each other by a movable or flexible seal 41. The first compartment and the second compartment are both fluidically connected to the at least two columns 70,80 via a system of valves 120, and in step b) the flow is directed to the first compartment of the hold tank, while in step c) the pumping is achieved by pumping a fluid into the second compartment of the hold tank, such that the content of the first compartment is conveyed to the second column.

In some embodiments the pump(s) 10; 100 comprise(s) peristaltic pump(s) such as multichannel peristaltic pump(s).

In certain embodiments the flows are controlled by a system of pumps 10; 100 and pinch valves electrically, pneumatically or hydraulically connected to a control unit 2.

In one aspect, illustrated by FIGS. 1-6, 8 and 11-15, the present invention discloses a method for chromatographic separation of a target biopolymer in a chromatography system 1; 110 which comprises one hold tank 40; connected to at least one inlet end 130 (through a pump 100) and at least one outlet end 140 of two columns 70,80 packed with a resin having affinity towards said target biopolymer and for each column at least one pump 100 and at least one outlet detector 11a, 11b. The method comprises the steps of:
a) providing a feed comprising the target biopolymer and pumping the feed through a first column 70 to a waste line 19a while monitoring the biopolymer concentration with a first outlet detector 11a,
b) directing the flow from the outlet detector to a hold tank 40 once the biopolymer concentration reaches a first predetermined level L1 and
c) directing the feed to a second column 80 once the biopolymer concentration reaches a second predefined level L2 and pumping the feed through the second column 80 to a waste line 19b and
d) providing a wash solution and pumping the wash solution through the first column 70 to the hold tank 40 and
e) pumping the content of the hold tank 40 to the second column 80 through a mixer 90 for further separation while directing the outlet from the second column 80 to the waste line 19a, while providing an elution solution and pumping a predefined volume of the elution solution through the first column 70 to the eluate tank 60 through detector 11b and
f) providing a series of regeneration solutions and pumping the solutions in a predefined order through the first column 70 to waste line 19a and
g) directing the flow from the outlet detector 11a to the hold tank 40 once the biopolymer concentration reaches the first predetermined level L1 and
h) directing the feed to the first column 70 once the biopolymer concentration reaches the second predefined level L2 and pumping the feed through the first column 70 to a waste line 19b and
i) providing the wash solution and pumping the wash solution through the second column 80 to the hold tank 40 and
j) pumping the content of the hold tank to the first column 70 through a mixer 90 for further separation while directing the outlet from the first column 70 to the waste line 19a, while providing the elution solution and pumping the predefined volume of the elution solution through the second column 80 to the eluate tank 60 through detector 11*b* and k) providing a series of regeneration solutions and pumping the solutions in a predefined order through the second column 80 to the waste line 19*a* l) repeating steps a-k until a predefined volume of the feed has been processed.

In some embodiments the hold tank 40 can be compartmentalized to provide dedicated compartments for the first column 70 and for the second column 80.

In one aspect, illustrated by FIGS. 1-6, 8 and 11-15, the present invention discloses a method for chromatographic separation of a target biopolymer in a chromatography system 1; 110 which comprises one hold tank 40; connected to at least one inlet end 130 (through a pump 100) and at least one outlet end 140 of two columns 70,80 packed with a resin having affinity towards said target biopolymer and (optionally for each column) at least one pump 100 and at least one outlet detector 11*a*,11*b*. The method comprises the steps of:

a) providing a feed comprising the target biopolymer and pumping the feed through a first column 70 to a waste receptacle 19*a* while monitoring the biopolymer concentration with a first outlet detector 11*a*, b) directing the flow from the outlet detector to a hold tank 40 once the biopolymer concentration reaches a first predetermined level L1 and c) directing the feed to a second column 80 once the biopolymer concentration reaches a second predefined level L2 and pumping the feed through the second column 80 to a waste line 19*b* and d) providing a wash solution and pumping the wash solution through the first column 70 to the hold tank 40*a* and e) pushing the content of the hold tank 40*a* to the second column 80 through a mixer 90 for further separation while directing the outlet from the second column 80 to the other compartment of the hold tank 40*b*, suitably until a preset time has passed or a preset pressure drop increase has been reached, whichever happens first, while providing an elution solution and pumping a predefined volume of the elution solution through the first column 70 to the eluate tank 60 through detector 11*b* and f) providing a series of regeneration solutions and pumping the solutions in a predefined order through the first column 70 to a waste line 19*a* and g) directing the flow from the outlet detector 11*a* to the hold tank 40*a* once the biopolymer concentration reaches the first predetermined level L1 and pushing the content of the second compartment of the hold tank 40*b* to the waste line 19*a* h) directing the feed to the first column 70 once the biopolymer concentration reaches the second predefined level L2 and pumping the feed through the first column 70 to a waste line 19*b* and i) providing the wash solution and pumping the wash solution through the second column 80 to the hold tank 40*a* and j) pushing the content of the hold tank 40*a* to the first column 70 through a mixer 90 for further separation while directing the outlet from the first column 70 to the second compartment of hold tank 40*b*, while providing the elution solution and pumping the predefined volume of the elution solution through the second column 80 to the eluate tank 60 through detector 11*b* and k) providing a series of regeneration solutions and pumping the solutions in a predefined order through the second column 80 to the waste line 19*a* l) repeating steps a-k until a predefined volume of the feed has been processed

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. It is to be noted that features of different embodiments can be combined to form further embodiments.

What is claimed is:

1. A chromatography system for separation of a biopolymer, comprising:
   a group of chromatography columns comprising at least a first column, a second column, and a third column, each respective column of the group of chromatography columns having at least one inlet end and at least one outlet end;
   a system of tanks comprising:
   (i) a feed tank,
   (ii) a group of hold tanks comprising at least three hold tanks,
   (iii) an elution buffer tank, and
   (iv) an eluate tank,
   wherein a first hold tank of the group of hold tanks has a first end connected to a respective inlet end of the first column and a second end connected to a respective outlet end of the third column,
   wherein a second hold tank of the group of hold tanks has one end connected to a respective inlet end of the second column and a second end connected to a respective outlet end of the first column, and
   wherein a third hold tank of the group of hold tanks has a first end connected to a respective inlet end of the third chromatography column and a second end connected to a respective outlet end of the second column,
   a group of pumps, each pump of the group of pump having a first end being directly fluidically connected to a respective inlet end of a respective column of the group of columns, each pump of the group of pumps having a second end directly fluidically connected to a respective hold tank of the group of hold tanks;
   an outlet detector fluidically connected to each column of the group of chromatography columns;
   a system of valves; and
   a control unit,
   wherein the control unit is connected to at least one valve of the system of valves, the group of pumps, and the outlet detector,
   convey wherein each hold tank of the group of hold tanks is adapted to receive a fluid from the outlet of a first respective column of the group of columns and convey fluid to an inlet of a second respective column of the group of columns, and
   wherein each hold tank of the group of hold tanks is configured to function as a temporary storage vessel to handle any mismatch flows between the first respective column and the second respective column.

2. The chromatography system of claim 1, wherein the control unit is electrically, pneumatically, or hydraulically connected to the system of valves.

3. The chromatography system of claim 1, further comprising at least one of an equilibration buffer tank, a wash buffer tank, and a regeneration liquid tank, wherein the equilibration buffer tank, the wash buffer tank, and the regeneration liquid tank are each configured to connect to an inlet of at least one pump of the group of pumps.

4. The chromatography system of claim 1, wherein each column of the group of chromatography columns is packed with a resin having affinity towards the biopolymer.

5. The chromatography system of claim 4, wherein the resin includes a proteinaceous ligand, derived from Protein A, Protein G, Protein L, or an antibody.

6. The chromatography system of claim 1, wherein at least one pump of the group of pumps, the outlet detector, and valves of the system of valves include disposable flow paths, mounted in reusable units.

7. The chromatography system of claim 1, wherein the group of pumps includes a multichannel peristaltic pump.

8. The chromatography system of claim 1, wherein the system of valves comprises a pinch valve.

9. The chromatography system of claim 1, wherein the system of valves is devoid of rotary valves and slide valves.

10. The chromatography system of claim 1, wherein each hold tank of the group of hold tanks comprises a first compartment and a second compartment, delimited from each other by a movable seal and wherein said first compartment and the second compartment are both fluidically connected to said group of chromatography columns via the system of valves.

11. The chromatography system of claim 1, wherein each hold tank of the group of hold tanks is cylindrical and the respective movable seal of each hold tank is in a slidable sealing abutment with a side wall of the hold tank.

12. The chromatography system of claim 1, wherein the movable seal is a flexible diaphragm.

13. The chromatography system of claim 1, wherein the first compartment is fluidically connected to an inlet end of a first respective chromatography column of the group of chromatography columns and the second compartment is fluidically connected to an outlet end of a second respective chromatography column of the group of chromatography columns.

* * * * *